(12) United States Patent
Schaefer et al.

(10) Patent No.: US 9,620,870 B2
(45) Date of Patent: *Apr. 11, 2017

(54) ADJUSTABLE ROOF MOUNTING SYSTEM

(71) Applicant: D THREE ENTERPRISES, LLC, Lafayette, CO (US)

(72) Inventors: Richard F. Schaefer, Fort Lupton, CO (US); David Kreutzman, Louisville, CO (US)

(73) Assignee: D Three Enterprises, LLC, Lafayette, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,105

(22) Filed: Jul. 15, 2015

(65) Prior Publication Data
US 2016/0118726 A1 Apr. 28, 2016

Related U.S. Application Data

(63) Continuation of application No. 14/290,594, filed on May 29, 2014, now Pat. No. 9,106,023, which is a continuation of application No. 13/843,376, filed on Mar. 15, 2013, now Pat. No. 8,752,338.

(60) Provisional application No. 61/643,097, filed on May 4, 2012.

(51) Int. Cl.
| | | |
|---|---|---|
| *H01R 4/64* | (2006.01) | |
| *F24J 2/52* | (2006.01) | |
| *E04B 1/38* | (2006.01) | |
| *H01R 13/648* | (2006.01) | |
| *H02S 20/00* | (2014.01) | |
| *H02S 20/23* | (2014.01) | |

(52) U.S. Cl.
CPC .............. *H01R 4/64* (2013.01); *E04B 1/38* (2013.01); *F24J 2/5245* (2013.01); *F24J 2/5254* (2013.01); *F24J 2/5258* (2013.01); *F24J 2/5264* (2013.01); *H01R 13/648* (2013.01); *H02S 20/00* (2013.01); *H02S 20/23* (2014.12); *E04B 2001/405* (2013.01); *Y02B 10/12* (2013.01); *Y02B 10/20* (2013.01); *Y02E 10/47* (2013.01); *Y02E 10/50* (2013.01)

(58) Field of Classification Search
CPC ....... H01R 4/64; H01L 31/0422; H01L 31/18; H02S 20/23; F24J 2/5245
USPC ...................................................... 52/173.3
See application file for complete search history.

(56) References Cited

U.S. PATENT DOCUMENTS

| | | |
|---|---|---|
| 5,609,326 A | 3/1997 | Stearns et al. |
| 6,141,928 A | 11/2000 | Platt |
| 6,360,491 B1 | 3/2002 | Ullman |
| 6,672,018 B2 | 1/2004 | Shingleton |
| 7,435,134 B2 | 10/2008 | Lenox |
| 7,780,472 B2 | 8/2010 | Lenox |

(Continued)

*Primary Examiner* — Beth Stephan
(74) *Attorney, Agent, or Firm* — Russell T. Manning; Marsh Fischmann & Breyfogle LLP

(57) ABSTRACT

An adjustable mounting system for mounting solar panels on roofs is disclosed. The system allows a user to mount the solar panels either with or without rails. The mounting assemblies are adjustable to allow the user to mount a base plate in a chosen location (either on a roof joist or other structural member or not) and to adjust the mounting location for the panel in as many as three axis of adjustment from the location of the base plate. A system for mounting and grounding the panels at the same time is also disclosed.

16 Claims, 28 Drawing Sheets

(56) References Cited

U.S. PATENT DOCUMENTS

| | | |
|---|---|---|
| 8,025,508 B2 | 9/2011 | Parker et al. |
| 8,181,926 B2 * | 5/2012 | Magno, Jr. .............. F24J 2/5258 248/220.21 |
| 8,276,330 B2 | 10/2012 | Harberts et al. |
| 8,413,944 B2 | 4/2013 | Harberts et al. |
| 8,448,405 B2 | 5/2013 | Schaefer et al. |
| 8,448,407 B1 | 5/2013 | Wiener |
| 8,475,185 B2 | 7/2013 | Rivera et al. |
| 8,479,455 B2 | 7/2013 | Schaefer et al. |
| 8,590,223 B2 | 11/2013 | Kilgore et al. |
| 2003/0015636 A1 | 1/2003 | Liebendorfer |
| 2003/0015637 A1 | 1/2003 | Liebendorfer |
| 2003/0070368 A1 | 4/2003 | Shingleton |
| 2003/0101662 A1 | 6/2003 | Ullman |
| 2003/0177706 A1 * | 9/2003 | Ullman .................. E04D 13/12 52/3 |
| 2008/0000173 A1 | 1/2008 | Lenox et al. |
| 2008/0010915 A1 * | 1/2008 | Liebendorfer ......... F24J 2/5205 52/173.3 |
| 2008/0053008 A1 | 3/2008 | Ohkoshi et al. |
| 2008/0244881 A1 | 10/2008 | Zante |
| 2008/0250614 A1 * | 10/2008 | Zante .................... F16B 5/0657 24/542 |
| 2008/0302928 A1 | 12/2008 | Haddock |
| 2010/0175337 A1 | 7/2010 | Mascolo et al. |
| 2010/0192505 A1 | 8/2010 | Schaefer et al. |
| 2010/0281793 A1 | 11/2010 | Mcpheeters et al. |
| 2010/0307074 A1 | 12/2010 | Stearns et al. |
| 2011/0036028 A1 | 2/2011 | Beck |
| 2011/0179606 A1 * | 7/2011 | Magno, Jr. .............. F24J 2/5258 24/457 |
| 2011/0179727 A1 | 7/2011 | Liu |
| 2011/0214365 A1 | 9/2011 | Aftanas |
| 2011/0214368 A1 * | 9/2011 | Haddock ................ F24J 2/5249 52/173.3 |
| 2012/0097816 A1 | 4/2012 | Tamm et al. |
| 2012/0102853 A1 | 5/2012 | Rizzo |
| 2012/0175322 A1 * | 7/2012 | Park ...................... F24J 2/5232 211/41.1 |
| 2012/0181402 A1 | 7/2012 | Putz et al. |
| 2012/0205508 A1 | 8/2012 | Cusson et al. |
| 2012/0233958 A1 | 9/2012 | Stearns |
| 2012/0244729 A1 | 9/2012 | Rivera et al. |
| 2013/0102165 A1 | 4/2013 | Dupont |
| 2013/0240466 A1 * | 9/2013 | Sponseller .......... H01L 31/0422 211/26 |
| 2014/0102517 A1 | 4/2014 | Meine et al. |
| 2014/0318604 A1 * | 10/2014 | Schrock ............ H01L 31/02008 136/251 |

\* cited by examiner

ADJUSTABLE ROOF MOUNTING SYSTEM

CROSS REFERENCE APPLICATIONS

This application is a continuation of U.S. application Ser. No. 14/290,594 filed on May 29, 2014, which is a continuation of U.S. application Ser. No. 13/843,376 filed on Mar. 15, 2013, now U.S. Pat. No. 8,752,338, which claims the benefits of provisional application No. 61/643,097 filed on May 4, 2012, all of which are hereby incorporated by reference for all purposes.

BACKGROUND

Many systems exist to mount various devices on roof tops and similar locations. One common device to mount on roofs is solar panels, particularly photovoltaic (PV) solar panels. Currently, to mount PV solar panels or other similar devices, rack systems are generally used. Due to the weight and attachment mechanism used with these rack systems, the attachment to the roof is typically into structural members. This requires that the roof framing be located beneath the shingles. The location of the rafters dictates the location and therefore spacing of the racking system, or at least its anchor points. Further, the installation can be made more difficult by unevenly spaced rafters and/or ones that are not strait and/or parallel or structures with no rafters, or purlins, such as stress skin panel installations. Additionally, the rails add significantly to the total height and weight of the system and to the cost of the installation.

The foregoing example of the related art and limitations related therewith are intended to be illustrative and not exclusive. Other limitations of the related art will become apparent to those of skill in the art upon a reading of the specification and a study of the drawings.

SUMMARY

One aspect of the present disclosure is a mounting system for PV panels and other devices that does not require rails, but allows the use of rails if desired.

One aspect of the present disclosure is a roof mounting system that can be mounted on to locations other than a rafter.

Another aspect of the present disclosure is a mounting system that allows adjustment in at least two directions of the location of the mounting device for the PV panel without having to move the attachment to the roof.

Another aspect of the present disclosure is a mounting system that reduces or prevents water leakage.

Another aspect of the present disclosure is a mounting device that provides for attaching and grounding the solar panels in a single device.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In addition to the exemplary aspects and embodiments described above, further aspects and embodiments will become apparent by reference to the accompanying drawings forming a part of this specification wherein like reference characters designate corresponding parts in the several views.

Figure 1:
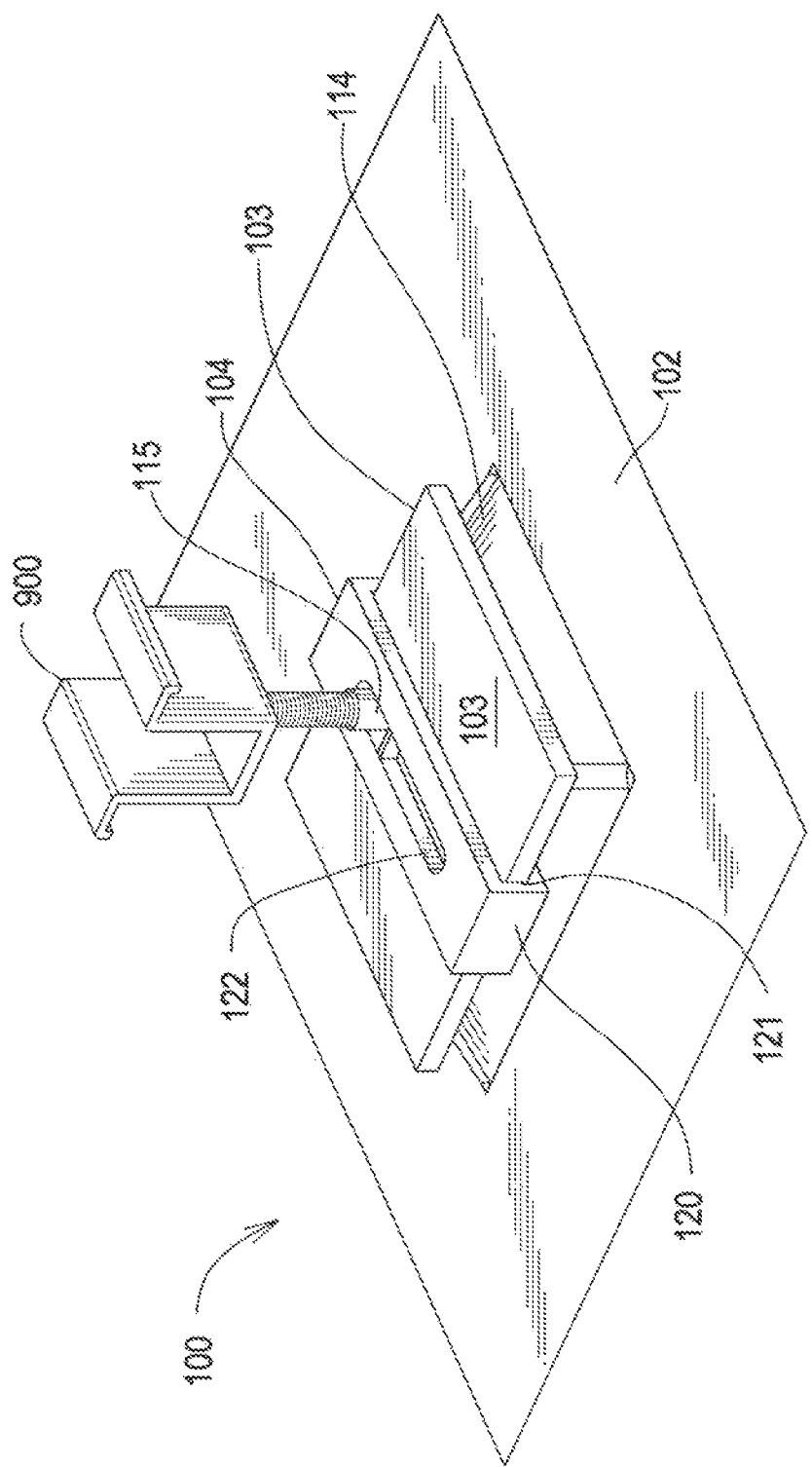
FIG. 1 is a perspective view of an adjustable combined flashing and mounting unit.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

All references to horizontal and vertical contained herein are references to the orientation of the items in the drawings. No limitation should be inferred as to the actual orientation of the items in use.

Figure 2:
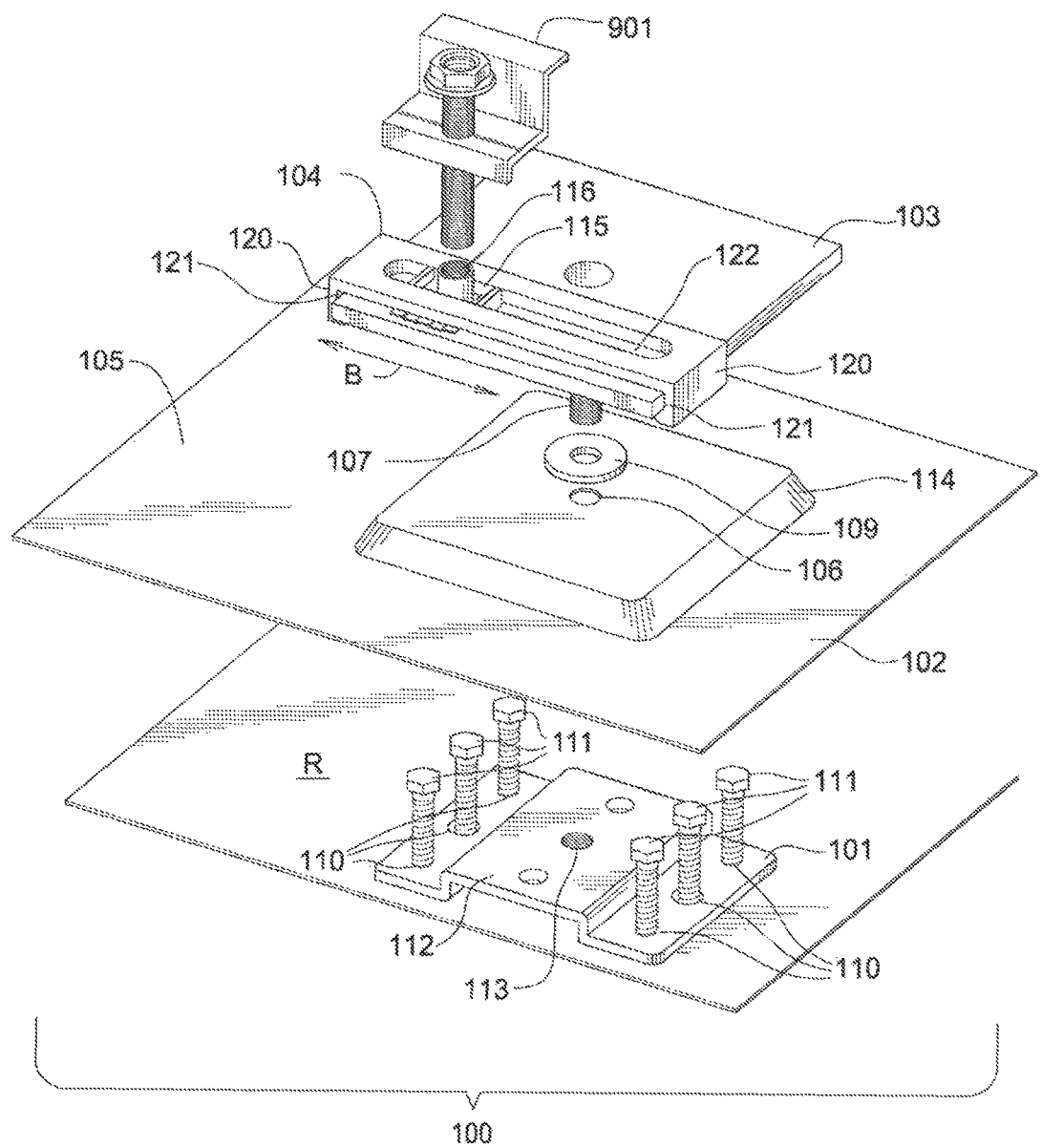
FIG. 2 is an exploded view of a combined flashing and mounting unit.
Figure 3:
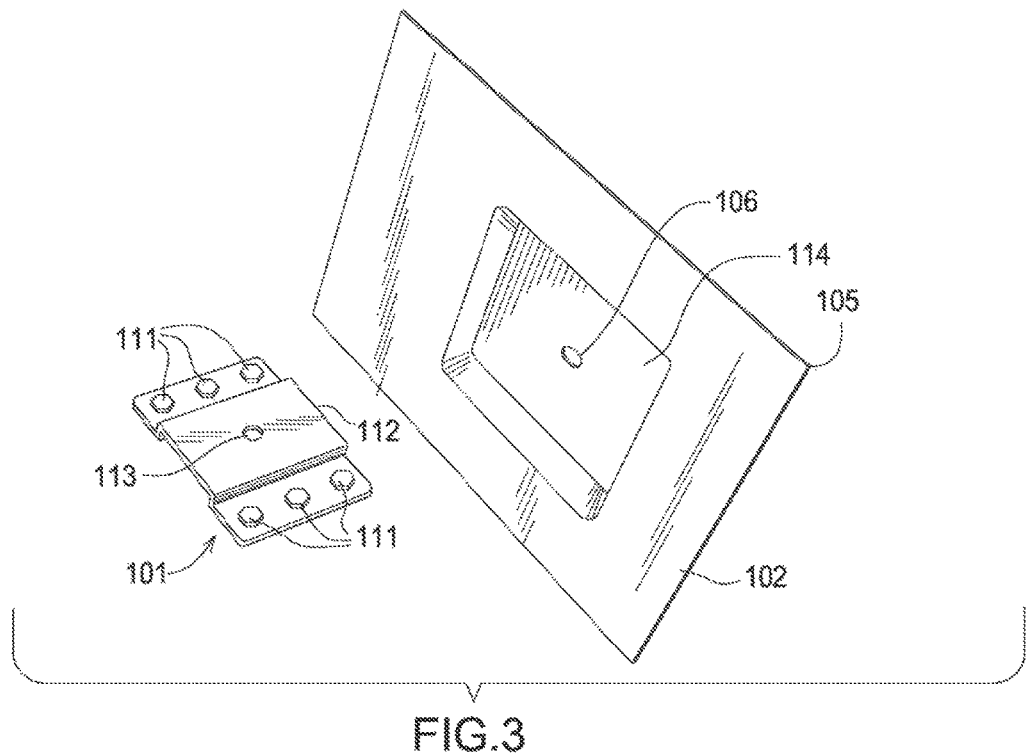
FIG. 3 is partially exploded view of the base plate and flashing.

Referring first to FIGS. 1 and 2, an adjustable combined mounting and flashing assembly 100 is shown. The mounting and flashing assembly has a mounting or base plate 101, a flashing 102, an attachment plate 103 and a slide plate 104 in the depicted embodiment. The base plate 101 attaches to a surface that the user wishes to mount something on, in the depicted embodiment this is a roof. The assembly could be used on any exterior surface of a building. The base plate 101 in the depicted embodiment has six mounting holes 110 that screws 111 are threaded into the roof through, attaching the base plate 101 to the roof R. Raised area 112 is located between two sets of mounting holes 110. The raised area 112 on the base plate 101 functions to strengthen the attachment points as designed. The "picnic table top design" helps to transfer any force being exerted upward by lift on the center hole to pull the bolts/screw in shear towards the center uplift point increasing the holding power of the attachment screws/bolts by not allowing the pullout to be approximately 90 degrees to the attachment bolts. This creates a significant increase in the force required to pull the mounting off the roof or other structure. In some applications, the raised center is not needed or a less raised center than the one shown can be used. No limitation in intended or should be inferred. The disclosed configuration allows the base plate 101 to be attached to the roof decking directly without having to thread the screws 111 into the rafters or other structural members in many applications. The three holes on each side of the depicted embodiment of the base plate 101 are multi-functional as they allow the system to be structurally attached in any of the holes allowing additional adjustment in the X and Y axis as compared to using single hole attachment. Depending on the application, more or fewer holes could be used, no limitation is intended or should be inferred.

The number and location of the mounting holes in any give embodiment depends on the desired installations choices. More holes allow a greater number of choices of the location of the screws 111. Wood screws are shown in the depicted embodiment. It is to be understood that other known fasteners could be used as well, depending on the surface the base plate 101 is mounted on and/or into. Examples of other fasteners include, but are not limited to, molly bolts, expansion bolts, lag bolts, screws (wood or metal) and concrete fasteners. Additionally, adhesives can be added to the fasteners or surface of the roof to increase strength. The base plate 101 has threaded hole 113 located in approximately the center of the raised area 112.

Figure 4:
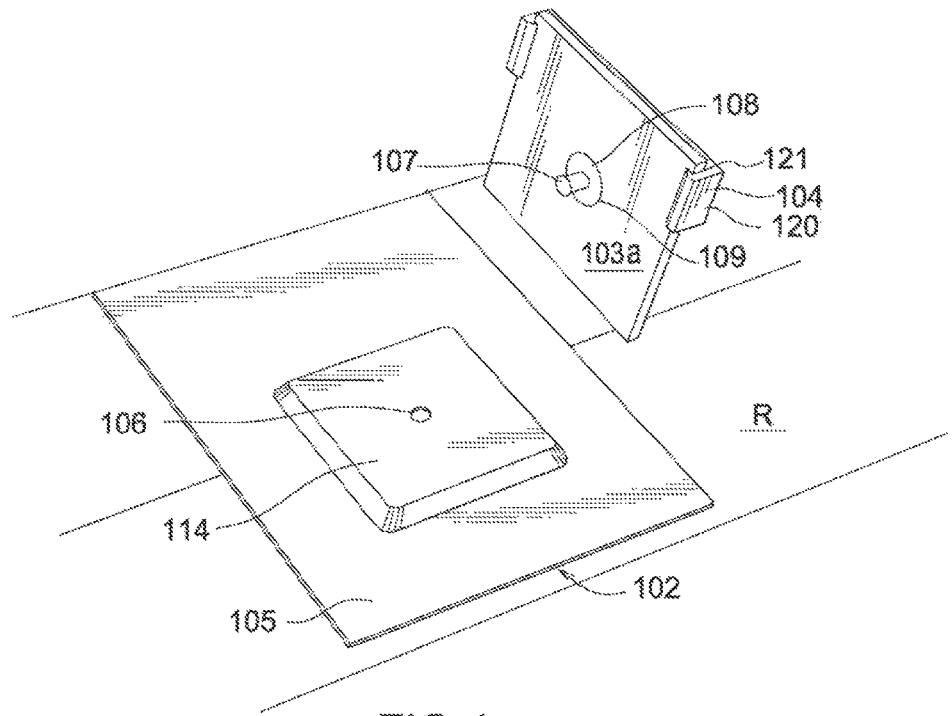
FIG. 4 is a partially exploded view of the attachment plate and the flashing.
Figure 5:
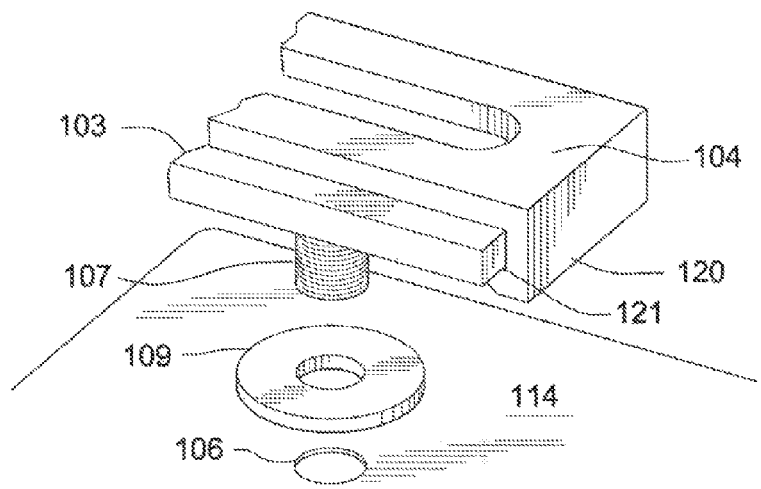
FIG. 5 is a partially exploded view of the washer, flashing and attachment base.

Flashing 102 fits over base plate 101, with raised area 114 of the flashing allowing the skirting 105 to rest directly on roof surface R as shown in FIGS. 2 and 4. Hole 106 is in the center of the raised area 114 and aligns with threaded hole 113 in base plate 101. Slide plate 104 is fitted on to attachment plate 103, as seen in FIGS. 2, 4 and 5. Slide plate 104 has first and second brackets 120 on opposing ends (See FIG. 2) where each bracket 120 includes a slot 121 allowing the slide plate 104 to be slidably attached to attachment plate 103. Slide plate 104 can be slid in the directions of arrow A in FIG. 6 to any location on the width of attachment plate 103.

Figure 8:
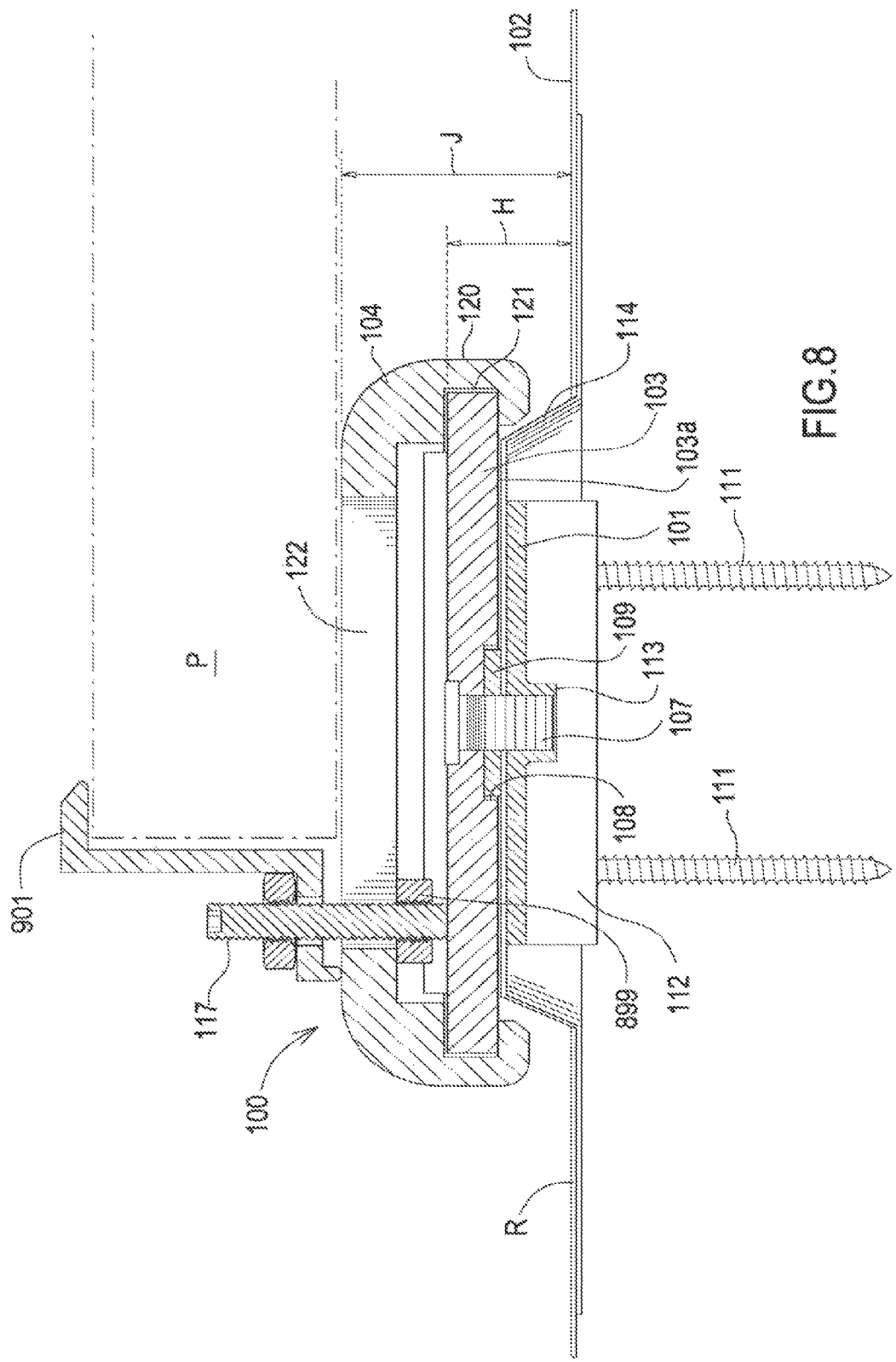
FIG. 8 is a cross sectional view through the assembled combined mounting and flashing unit.

As best seen in FIGS. 4 and 8, attachment plate 103 has threaded post 107 extending from the lower side 103a. Threaded post 107 is surrounded by recess 108 which contains flexible washer 109, as seen in FIGS. 4 and 5 in addition to FIG. 2. The depth of the recess 108 needs to be chosen in relation to the thickness of the flexible 109 washer such that the flexible washer 109 is compressed against the flashing 102. Although the recess 108 and the washer 109 are shown circular in the depicted embodiment, any shape of washer that encircles the threaded post 107 would work, no limitation is intended or should be inferred. In the depicted embodiment the washer is a soft flexible material. Rubber/synthetic rubber/silicone or other suitable compressible washer material using any known or later discovered polymer with similar properties could be used as well. O-rings or simple caulking could be used as well if desired in a particular installation. Threaded post 107 is fitted through hole 106 in flashing 102 and then threaded into threaded hole 113 in base plate. This can be done by hand, using the attachment plate to turn the threaded post. As the attachment plate 103 is a 4½ inch square in the depicted embodiment, the slide plate 104 can be mounted on attachment plate 103 at 90 degrees to the depicted embodiment. This allows the user the option of up or down or left to right sliding without affecting the compression of the washer.

Figure 6:
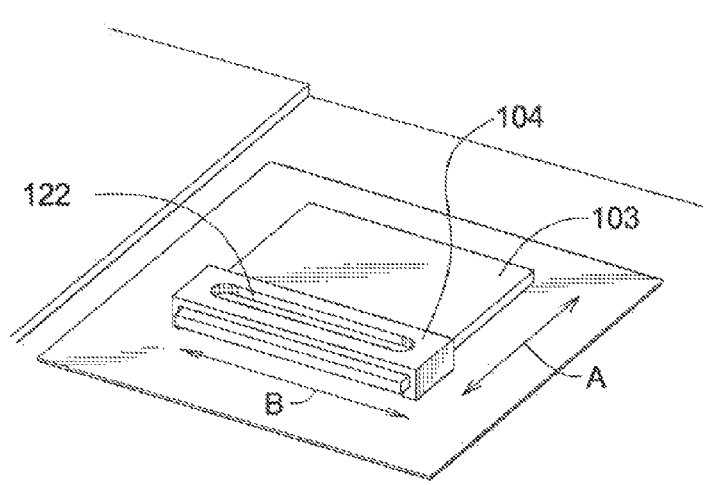
FIG. 6 is a perspective view of the flashing with the attachment base attached and the slide plate attached to the attachment base.
Figure 7:
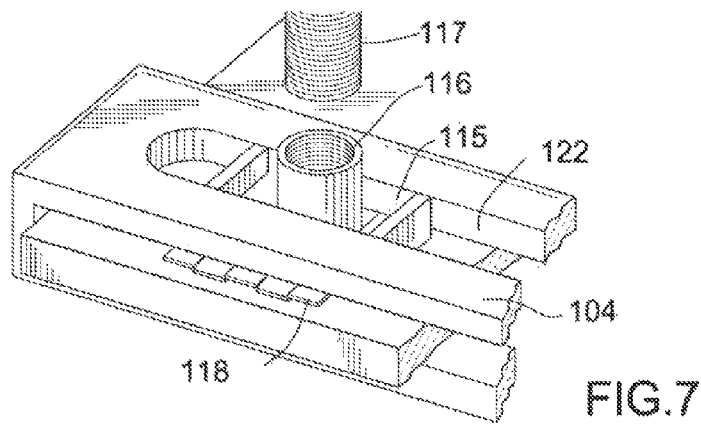
FIG. 7 is an exploded view of the nut retaining clip and the attaching bolt.

As best seen in FIGS. 2, 6 and 7, the slide plate 104 has a groove 122 running longitudinally along the length of slide plate 104 in a direction transverse to the direction slide plate 104 can be slid along attachment plate 103 shown by Arrow A. A nut retaining clip 115 is slidably retained in groove 122 when slide plate is mounted on attachment plate 103 and can be moved in the directions indicated by arrow B in FIGS. 2 and 6. The nut retaining clip 115 has threaded hole 116 extending there thru. In the depicted embodiment nut retaining clip 115 has grounding flanges 118.

FIG. 8 is a cross sectional view of the assembled adjustable combination flashing and mounting assembly. When assembled, the threaded post 107 of the attachment plate attaches the attachment plate 103 to the base plate 101 at threaded hole 113, locking the flashing 102 in place and compressing the flexible washer 109 between the attachment plate 103 and the flashing 102, sealing hole 106, preventing any water from getting down into base plate 101 and the roof surface R that has been pierced by screws 111. The slide plate 104 is fixed in a desired location, as discussed below, when attachment bolt 117 is threaded into nut 899. The attachment bolt 117 is tightened until is cuts into attachment plate 103, locking slide plate 104 in place and grounding the attachment bolt 117. This also pulls the slide plate 104 so that the brackets 120 are pulled up against the bottom of the attachment plate 103 and slightly bowing the slide plate, further spreading the load over the attachment plate. Any desired attachment device can be attached to attachment bolt 117, in FIG. 1-8 a mounting clip 900, 901, double and single or respectively, for a PV panel is shown.

Figure 10:
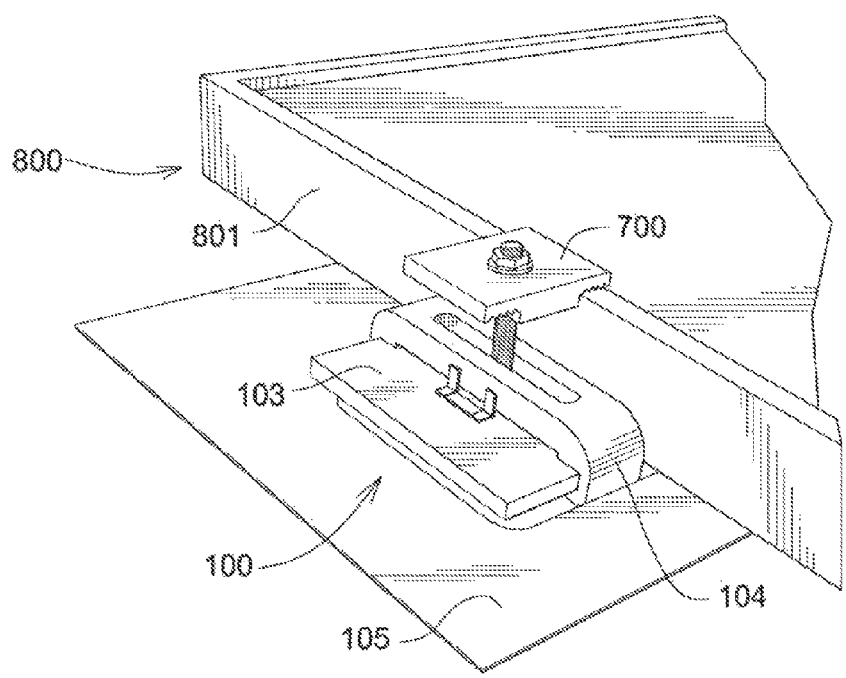
FIG. 10 is an isometric view of a solar panel mounted in the assembled combined mounting and flashing unit.

When the panel P is mounted between the clip 901 and the attachment plate 103 as seen in FIG. 10, the panel P is held a distance H off the roof R, marked in FIG. 8. In the depicted embodiment H is in a range of ¾ of an inch to 1½ inches. This is much closer to the roof R than prior art racking systems, allowing for a lower profile for the overall installation. This low profile design is very aesthetically pleasing, and is believed to minimize rodents, insects and others from wanting to occupy the space under the panels. This method also provides a way for glass only panels to be attached in a very aesthetically pleasing way. Further the lack of rails in most installations creates an unobstructed area under the panels for air flow. This creates a narrow, obstruction free flow path for the air under the panels, which is believed to increase the velocity of the air flow under the panels. Preliminary testing indicates that the close mounting to the roof and the unobstructed air flow path may increase the efficiency of the PV system over similar height rail systems due to the lack of obstructions increasing the air flow, thereby keeping the panels cooler. As the panel P heats up in use, the air under the panel is also heated. As the hot air rises towards the top end of the panel, an air current under the panel is created. The narrowness of the channel under the panel increases the speed of the air flow, causing more cool air to be sucked under the panel from the surrounding air. With panels with horizontal rails air flow is restricted, vortexes are created, and hot spots can develop due to the air flow being restricted by the rails.

If desired a greater height of the roof is desired, the panel P can be mounted on the slide plate 104, as shown in FIG. 8. In this instance the panel will be the distance J off the roof.

The combination of the base plate 101, the attachment plate 103 and the slide plate 104 provide for significant adjustability in the installation of devices, including solar panels on roofs and other surfaces. For example if one is mounting a solar module that is about 4 feet wide the depicted embodiment gives one a combined adjustment range of about plus or minus 6" for attaching to the structural members at 48" on center. This allows the user to attach into structural members that exist on 48" centers a panel ranging from 42"-54" in size. Additionally if the user puts the module in landscape the systems allows the installer to hit structural members in conventional construction almost every time given the standard panel sizes. Hybrid uses are also possible, i.e. attach into structural members in some locations and attached only into structural sheathing in others. This is particularly desirable, as different areas of an installation can have radically different amounts of uplift.

Figure 9:
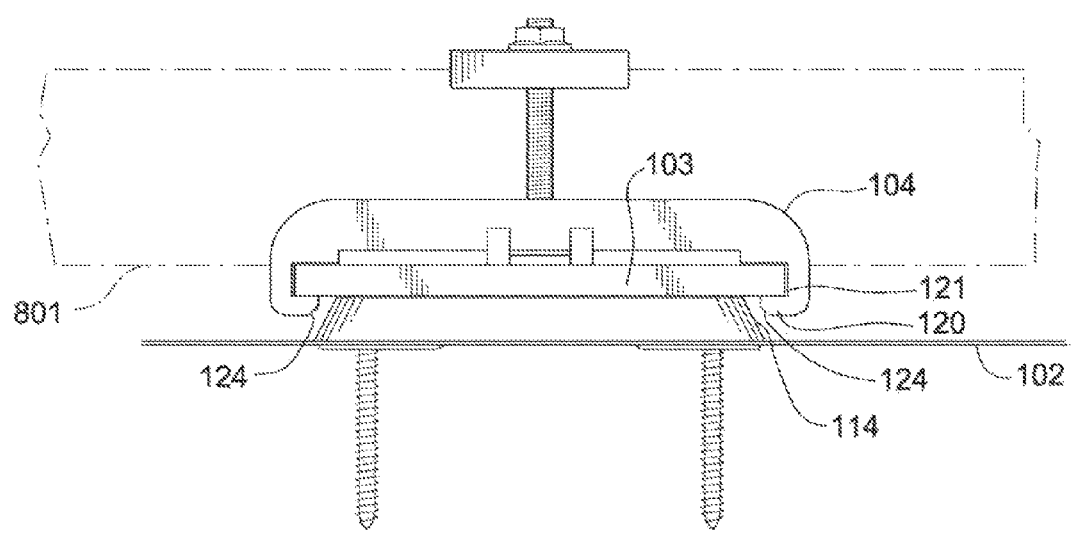
FIG. 9 is a partial cut away view of the assembled combined mounting and flashing unit.

An additional function of the adjustable combined mounting and flashing assembly 100 is that interlocking the various pieces prevents the rotation of the panels on the roof when being installing and once installed. As best seen in FIGS. 9 and 10 there are two possible places where the assembly can reduce or eliminate rotation of the panels when installed. In FIG. 9, the bracket 120 of the slide plate 104 has edge 124 that is located close to the sides of raised area 114 of flashing 102. Once the attachment plate 103 is tightened down on the flashing 102 such that the flexible washer is compressed, it is not desirable that the attachment plate 103 rotate in either direction. First because this could decompress the washer and second because this could allow the clips discussed below to slip off the solar panel. When the slide plate 104 is slid onto the attachment plate 103 the edge 124 of the bracket 120 contacts the side of the flashing if the attachment plate 103 moves more than a very minor amount in either direction, preventing any further rotation. This reduces the rotation when the panel is mounted either resting on the attachment plate or resting on the slide plate.

FIG. 10 is an isometric view of a solar panel 800 mounted in the adjustable combined mounting and flashing assembly 100 resting on the attachment plate 103. Once the panel is mounted in the assembly 100 as discussed below, the slide plate 104 is substantially parallel to the frame 801 of the panel 800 as seen in FIG. 10. Any side to side or rotational movement of the panel 800 would be stopped by the slide plate 104 when the slide plate 104 is properly installed flush against the panel. Any rotation of the attachment plate 103 would cause rotation of the slide plate 104 it is attached to, and any such rotation of the attachment plate 103 would be stopped by the interaction of the edge 124 of bracket 120 and the flashing 105 as discussed above. This combination results in the panels 800 being held in place with great stability and little chance of rotating out of the mounting brackets, as can be a danger in other mounting systems.

Figure 11:
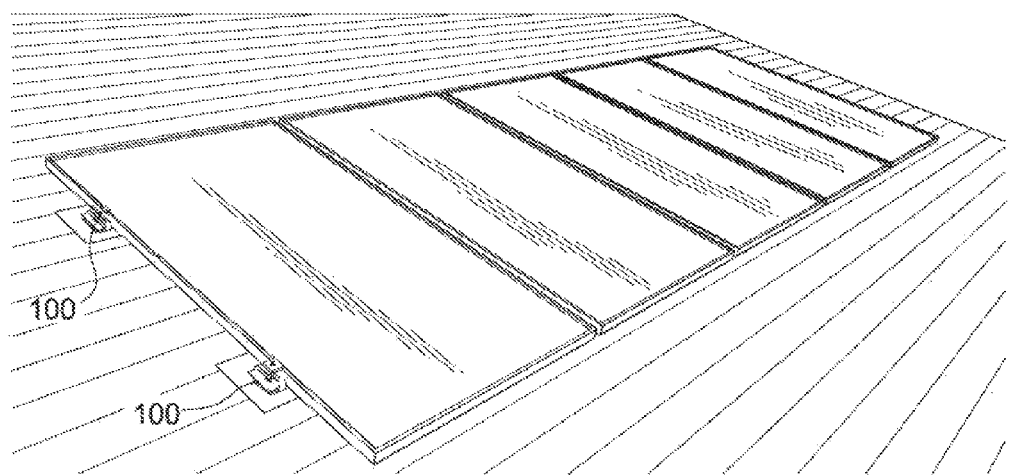
FIG. 11 is an isometric view of solar panels mounted on a roof in portrait orientation.
Figure 12:
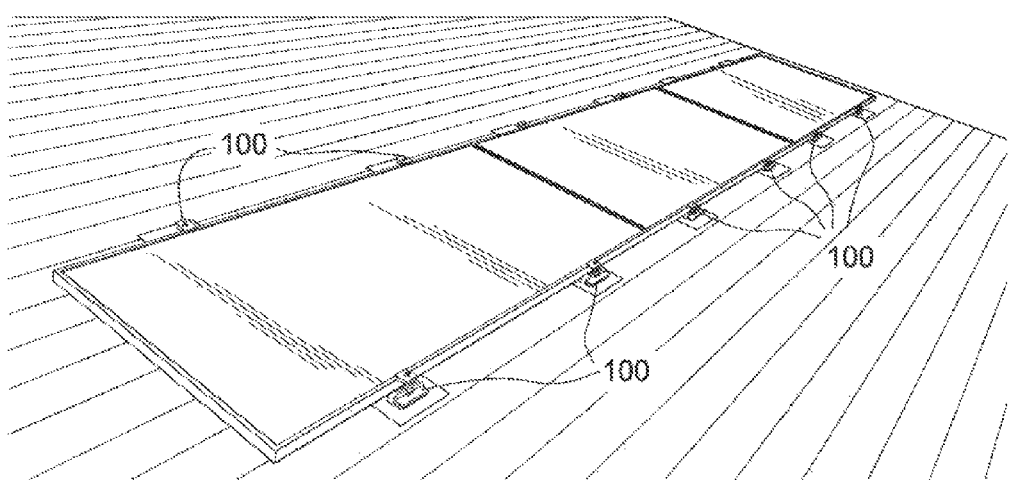
FIG. 12 is an isometric view of solar panels mounted on a roof in landscape orientation.

FIG. 11 shows a number of adjustable flashing and mounting assemblies 100 spaced on a roof with solar panels 800 mounted in portrait orientation. FIG. 12 shows a number of adjustable flashing and mounting assemblies 100 spaced on a roof with solar panels in landscape orientation. As can be seen from both FIGS. 11 and 12 when installed the adjustable flashing and mounting assemblies 100 bracket the solar panels, locking them in place on the roof with minimal mounting hardware and no rails. This significantly reduces the amount of material needed for mounting the solar panels, reducing the cost of shipping and installing solar panel systems. Further the adjustable flashing and mounting systems 100 has a low profile and are minimally visible.

Figure 13:
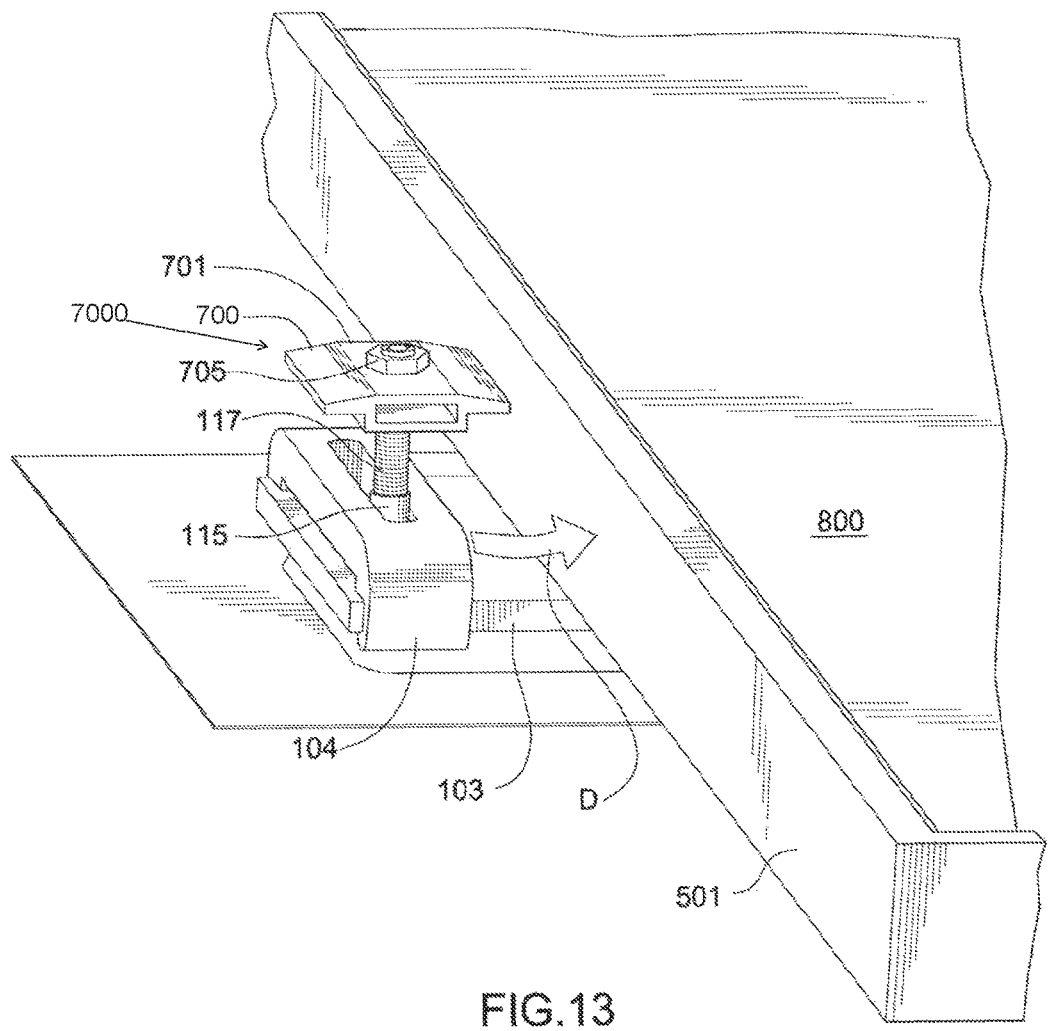
FIG. 13 is an perspective view of the slide plate being moved against the solar panel during mounting.

FIG. 13 shows adjusting the slide plate 104 up against the side of the PV panel 800 as shown by arrow D. A double clip 7000 is mounted on attachment bolt 117 by bushing 701.

Figure 14:
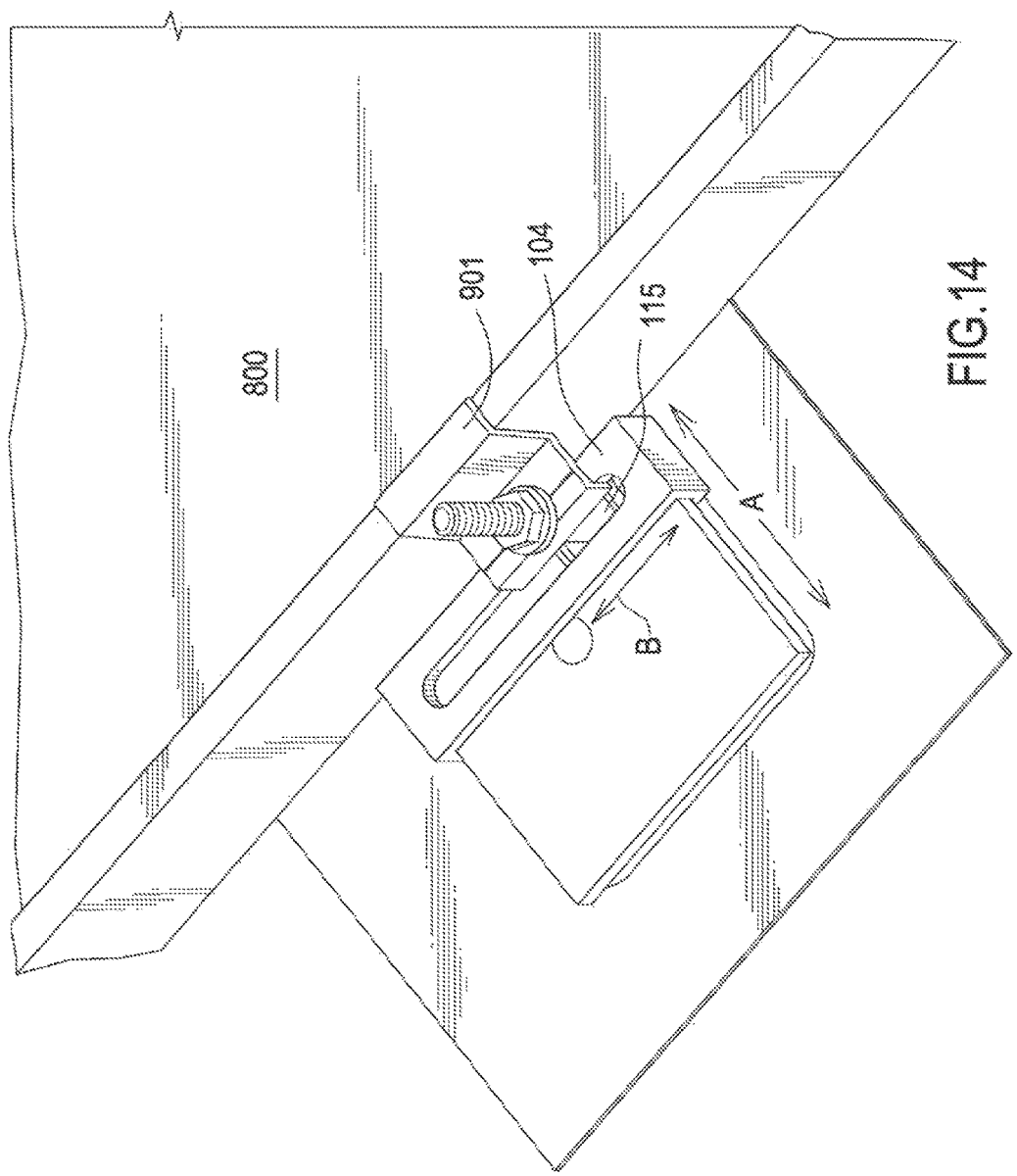
FIG. 14 is an isometric view of a solar panel mounted with a retaining clip.
Figure 15:
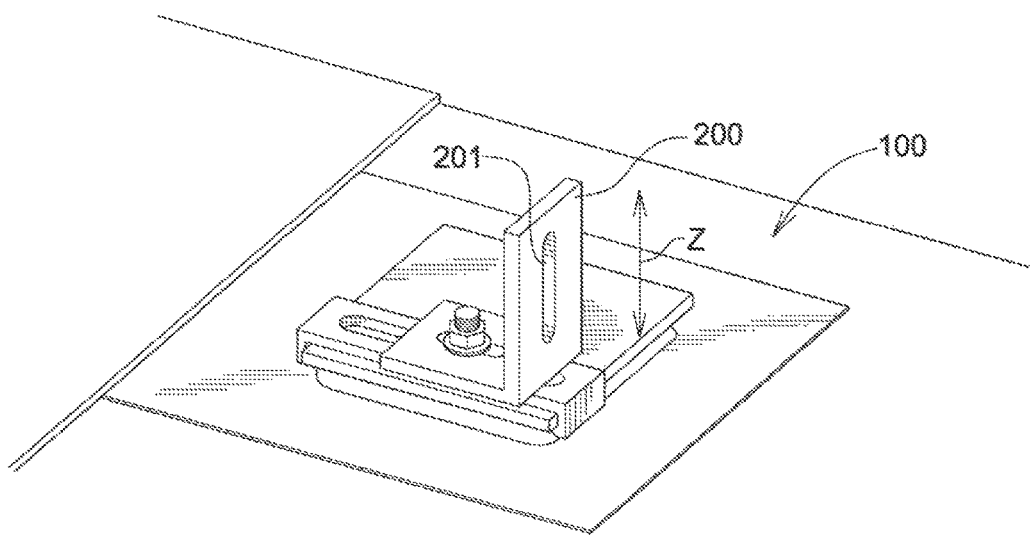
FIG. 15 is an isometric view of an assembly with an L bracket attached.
Figure 16:
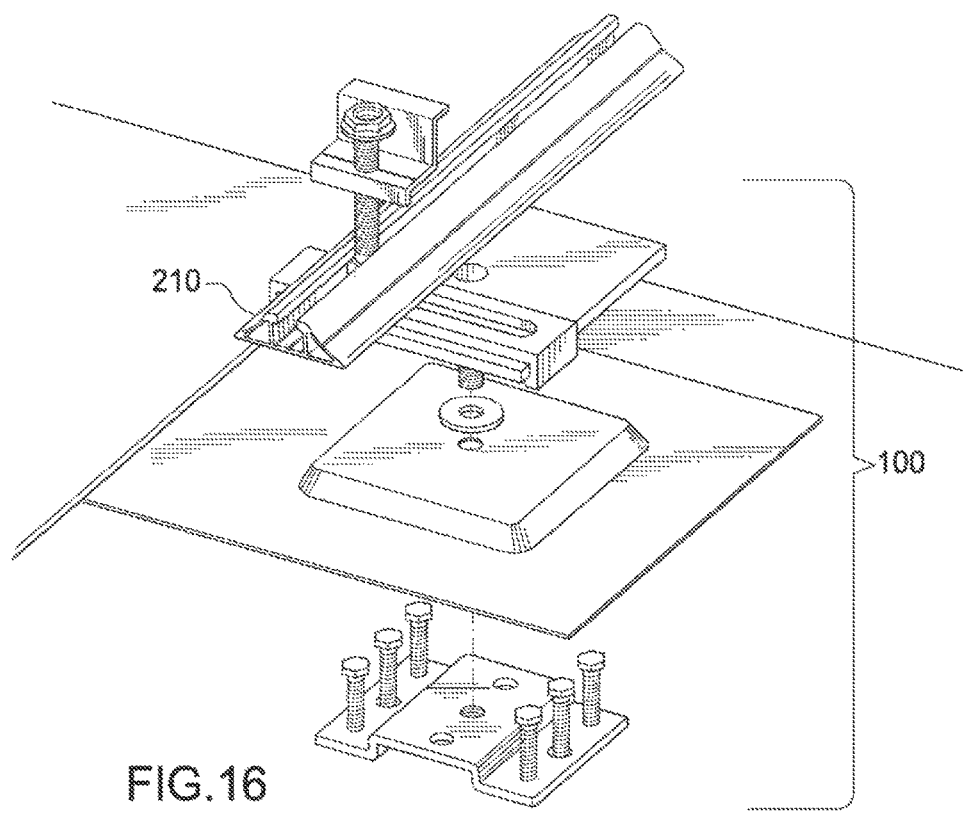
FIG. 16 is a partially exploded view of an assembly with a rail attached.
Figure 17:
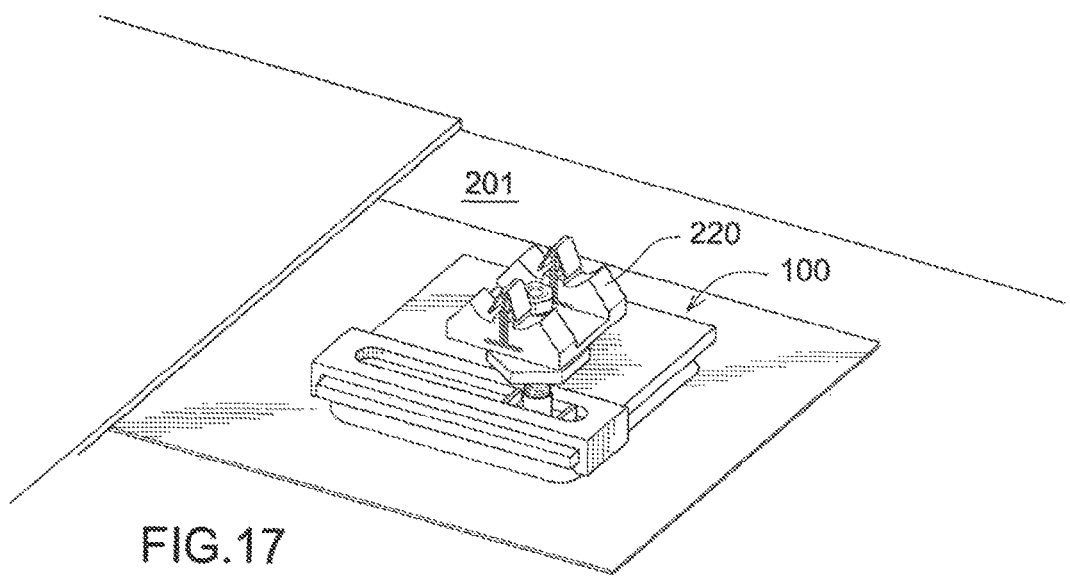
FIG. 17 is an isometric view of a snap in bracket mounted on the assembly.

FIG. 14 shows the panel 800 being held in place with a single retaining clip 901 at the chosen location. Arrows A and B shown the direction of adjustment for the slide plate 105 and nut retaining clip 115 respectively In addition to the retaining clip discussed above, any number of other attachment devices could be attached to the attachment bolt. FIG. 15 is a perspective view of an L bracket 200 attached to the adjustable flashing and mounting assembly 100. The slot 201 can be used to have an additional direction of adjustment of location of the attachment. The user could place the attaching bolt anywhere along slot 201 as shown by arrow Z. FIG. 16 is an exploded view of a rail 210 being attached to the adjustable flashing and mounting assembly 100. Short rail sections can be mounted as shown to provide additional adjustment in a given direction along the longitudinal length of the rail, or rails can be run between multiple adjustable flashing and mounting assemblies (not shown) where the adjustability of the system makes it easier to get the rails in the exact needed location accounting for variation on the roof surface. FIG. 17 shows a snap in bracket 220 mounted on the adjustable flashing and mounting assembly 100.

Figure 18:
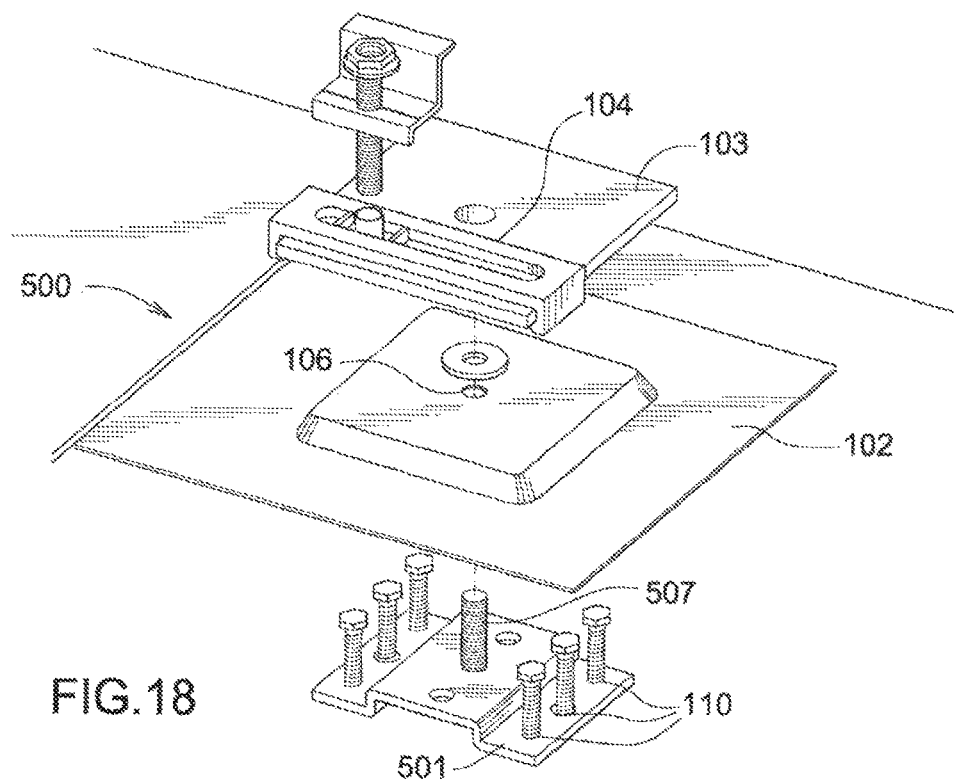
FIG. 18 is an exploded view of an alternate embodiment of the assembly.

FIG. 18 shows an alternate embodiment of the adjustable flashing and mounting assembly 500. In this embodiment the threaded bolt 507 is attached to the base plate 501 to extend up through hole 106 in flashing 102. Attachment plate 103 would then have a threaded recess surrounded by the recess for washer 106 as above. All other part could remain the same if desired.

Figure 19:
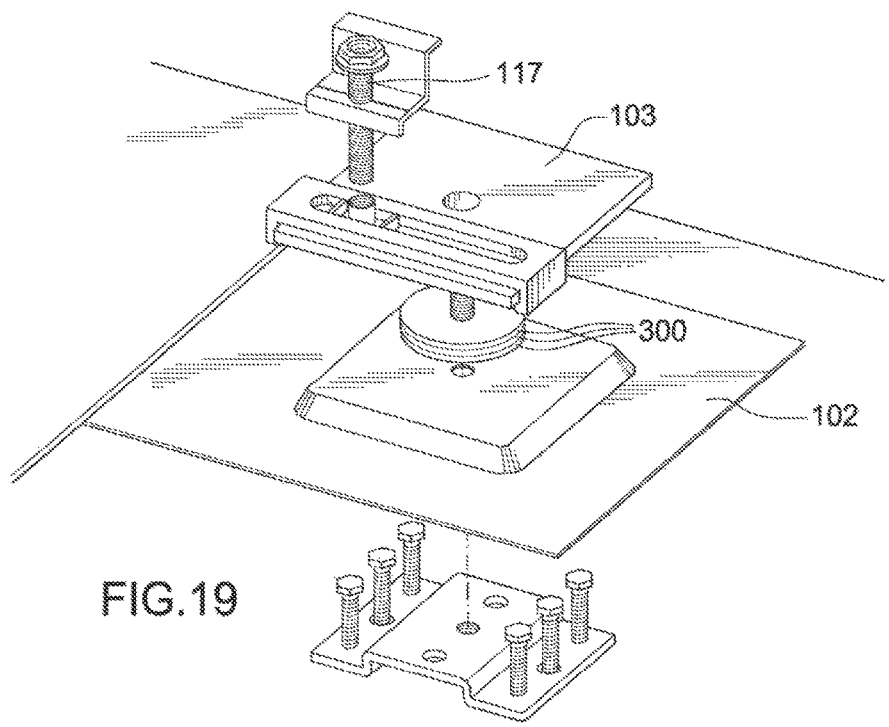
FIG. 19 is an exploded view of the assembly with washers used as spacers to create more height in the assembly.
Figure 20:
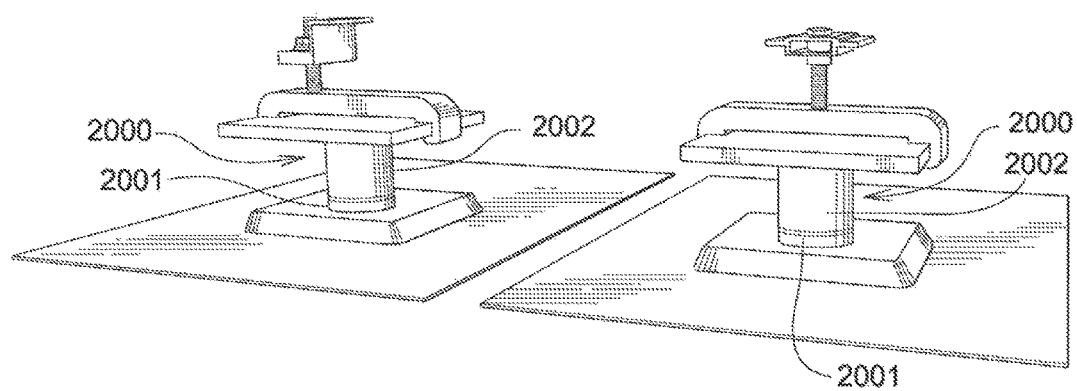
FIG. 20 is a perspective view of two assemblies side by side on a roof with adjustable standoffs.

As seen in FIG. 19, if it is needed to raise the attachment plate 103 to raise the location of the attachment bolt 117, spacers 300 can be added under the attachment plate 103. In the depicted embodiments washers are shown as the spacers, but any shape spacers would work as well. FIG. 20 shows an additional method to raise the height of attachment plate 103. Adjustable stand offs as disclosed in US Pat. Publication US 2010/0192505 can be used to adjustable raise the attachment plate 103 to a very precise and adjustable height. Standoff 2000 has a base 2001 and a cover 2002. The cover 2002 is attached to the base by threading on the exterior of the base and interior of the cover. This threading allows the standoff 2000 be adjusted to fully adjustable range of heights.

Figure 21:
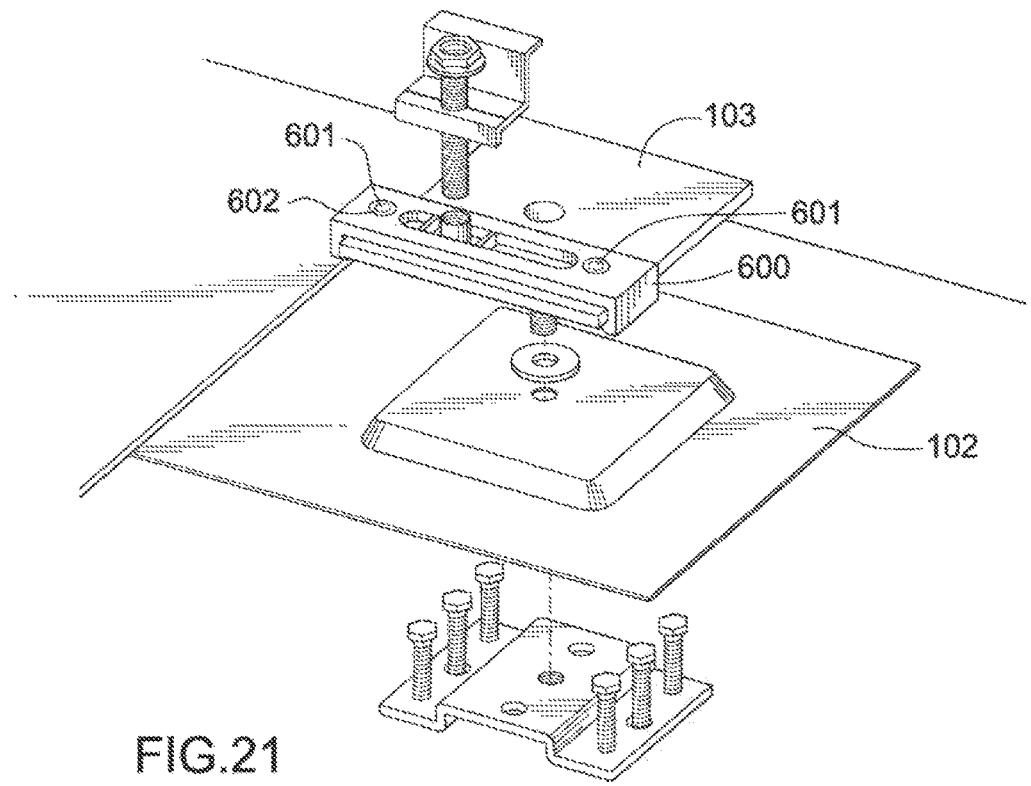
FIG. 21 is an exploded view of another alternate embodiment.

FIG. 21 is an exploded view showing an alternate embodiment of slide plate 600. In this embodiment hex screws 601 are threaded into threaded holes 602 that extend through slide plate. The hex screws would thread down into threaded holes 602 to come into contact with attachment plate 103, providing further locking of slide plate in place if needed.

Figure 22:
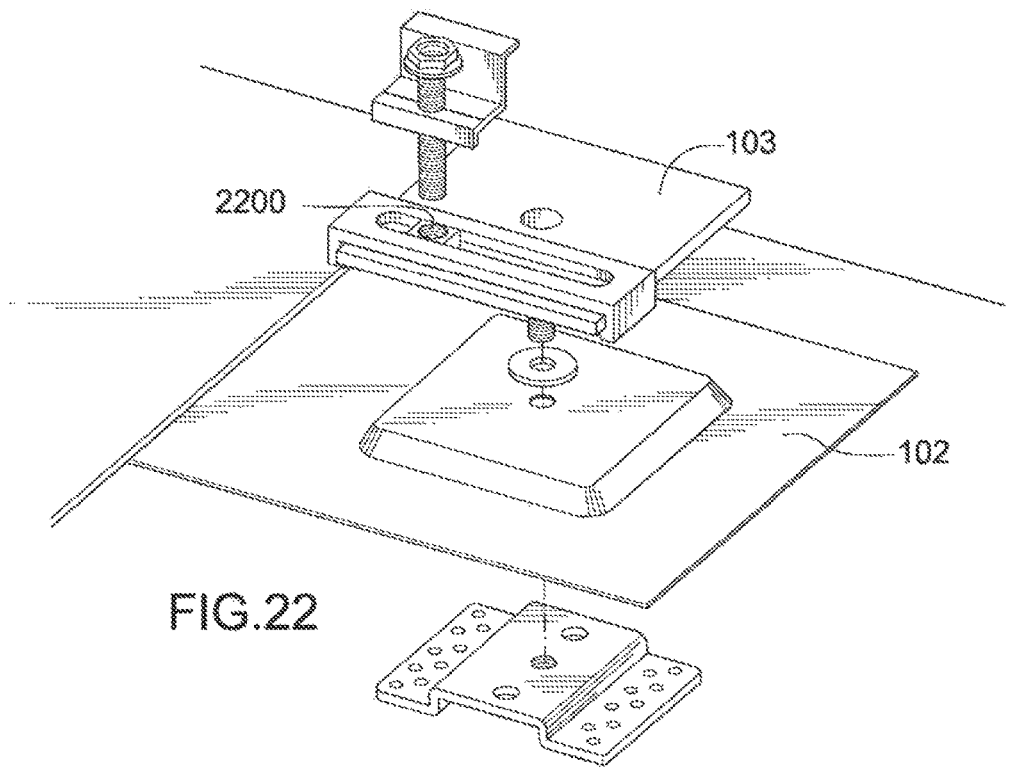
FIG. 22 is an exploded view of another alternate embodiment of the nut retaining clip.

FIG. 22 is an alternate embodiment where a standard nut 2200 is used allowing for more thickness of the nut if needed.

Figure 23:
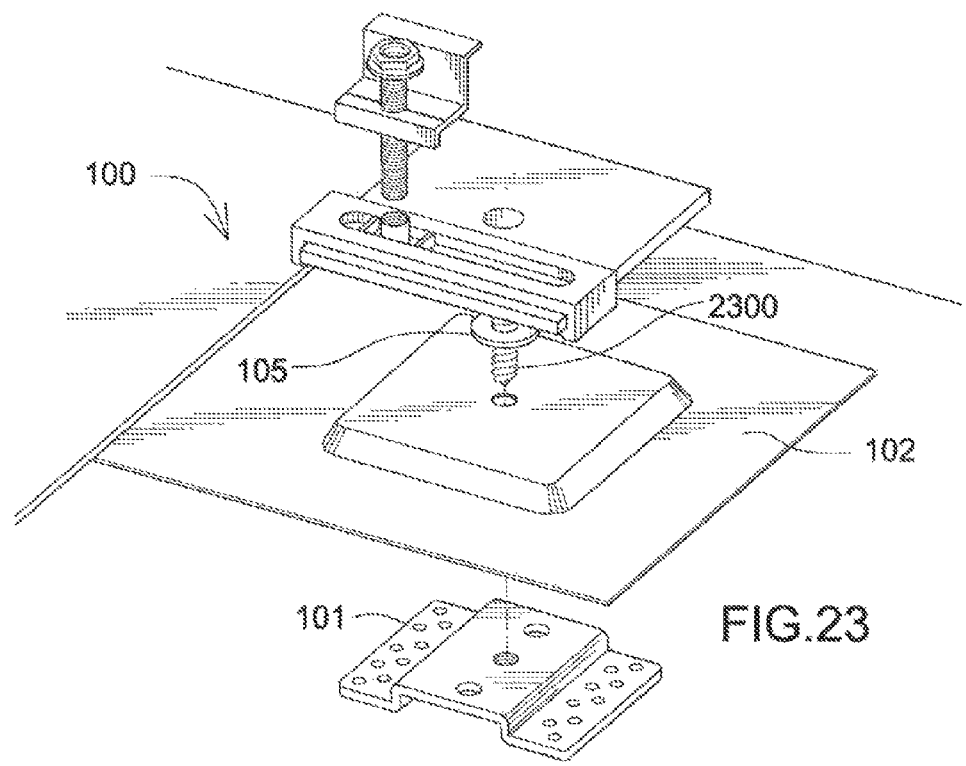
FIG. 23 is an alternate embodiment of the assembly using a lag bolt.

FIG. 23 shows an embodiment of the adjustable flashing and mounting assembly with a lag bolt 2300 attaching the adjustable mounting assembly 100 to the roof structure.

Figure 24:
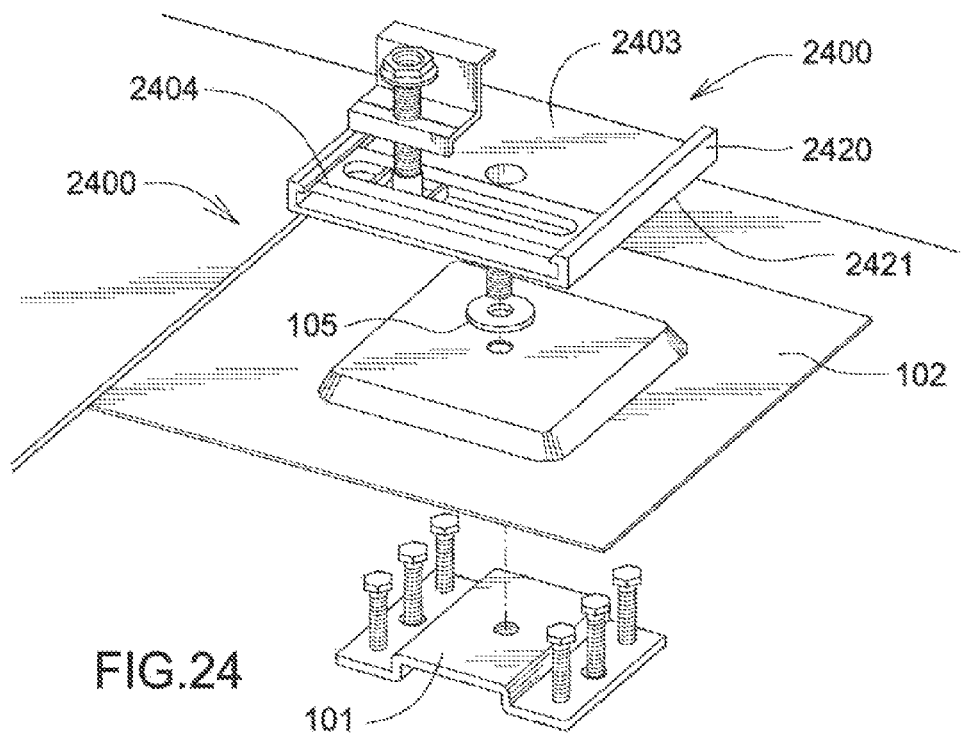
FIG. 24 is an exploded view of an alternate embodiment of the attachment plate slide plate combination where the brackets with slots are formed on the attachment plate instead of the slide plate.

FIG. 24 is an exploded view of an alternate embodiment of the attachment plate slide plate combination 2400 where on the attachment plate 2403 has brackets 2420 with grooves 2421. The slide plate 2404 is a flat plate that slides in the grooves 2421. All other components are identical.

Figure 25:
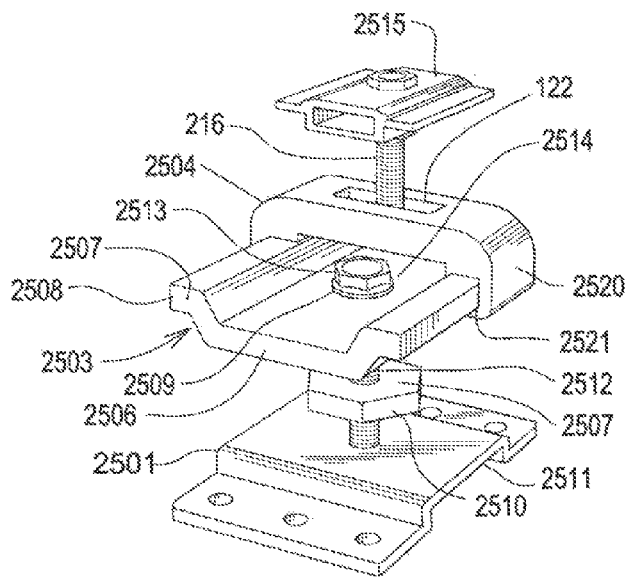
FIG. 25 is a partially exploded view of another embodiment of the mounting system.

FIG. 25 is a partially exploded view of another embodiment of the mounting system using the slide plate 2504. The slide plate in the embodiment depicted has rounded edges and is slightly thicker, but functions identically to the previously described slide plate with the brackets 2520 and the grooves 2521. In the depicted embodiment the slide plate 2504 is mounted on a channel plate 2503 having a channel base 2506 and channel sides 2507. The channel sides have flanges 2508 that are shaped to engage the grooves 2521 of the slide plate. The channel plate has a mounting location 2509, which can be either a hole or a slot running along the longitudinal direction of the channel plate.

Figure 26:
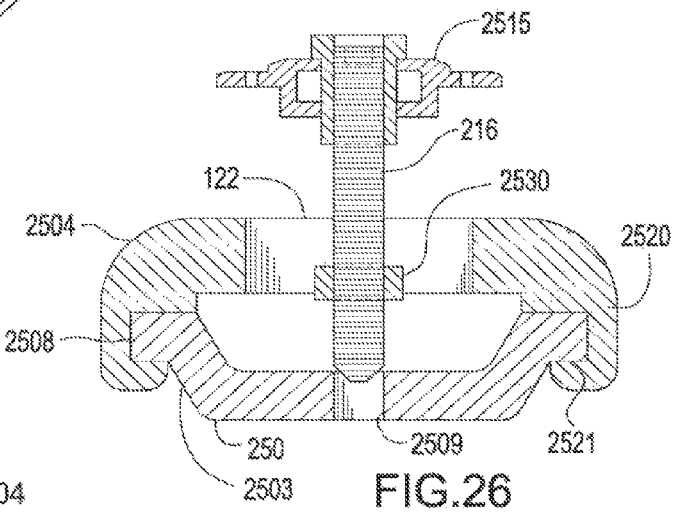
FIG. 26 is a partial cross section of the slide plate mounted on a channel plate.

The channel plate 2503 is mounted on an external surface of a building using the double stud 2510 and base plate 2511 disclosed in US Pat. Pub. 2012/0144760 to Schaefer, which is hereby incorporated by reference. The depicted embodiment does not have the flashing shown for clarity of the drawings, but it is expected that most installations will use the flashing as described to seal the mounting of the base plate 2511 to the exterior surface (not shown). The upper bolt 2512 of the double stud is used to attach the channel plate 2503 through the mounting location 2509 with nut 2513. The nut 2513 can have a serrated flange 2514 to ground the channel plate 2503 to the double stud 2510 if desired. The slide plate 2504 can be slid along the flanges 2508 to a desired location to mount a solar panel (or other desired object). In the depicted embodiment a double top clip 2515 (discussed below) is shown to mount a solar panel (not shown). The attachment bolt 216 of the double top clip 2515 is inserted through the nut 2530 in groove 122 as described above. As seen in FIG. 26, the attachment bolt 216 extends downward and cuts into the channel plate, locking the slide plate 2504 in place and grounding the attachment bolt 216.

Figure 27:
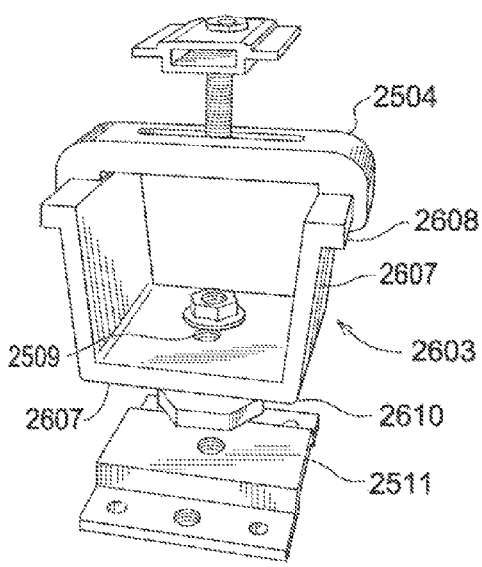
FIG. 27 is a partially exploded view of another embodiment of the mounting system.
Figure 28:
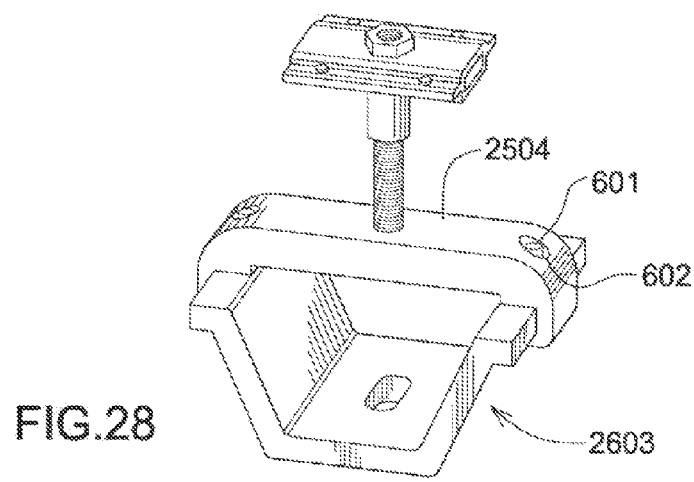
FIG. 28 is a view showing the slide plate mounted on a channel plate with hex screws.

FIGS. 27 and 28 shows another embodiment of the channel plate 2603 with taller channel side 2607 extending from the channel base 2607. As the added height of the channel makes it difficult to have an attachment bolt extending all the way down, the slide plate 2504 is locked in place with the In this embodiment, hex screws 601 are threaded into threaded holes 602 that extend through slide plate. The hex screws would thread down into threaded holes 602 to come into contact with the flanges 2608.

Figures 29, 30:
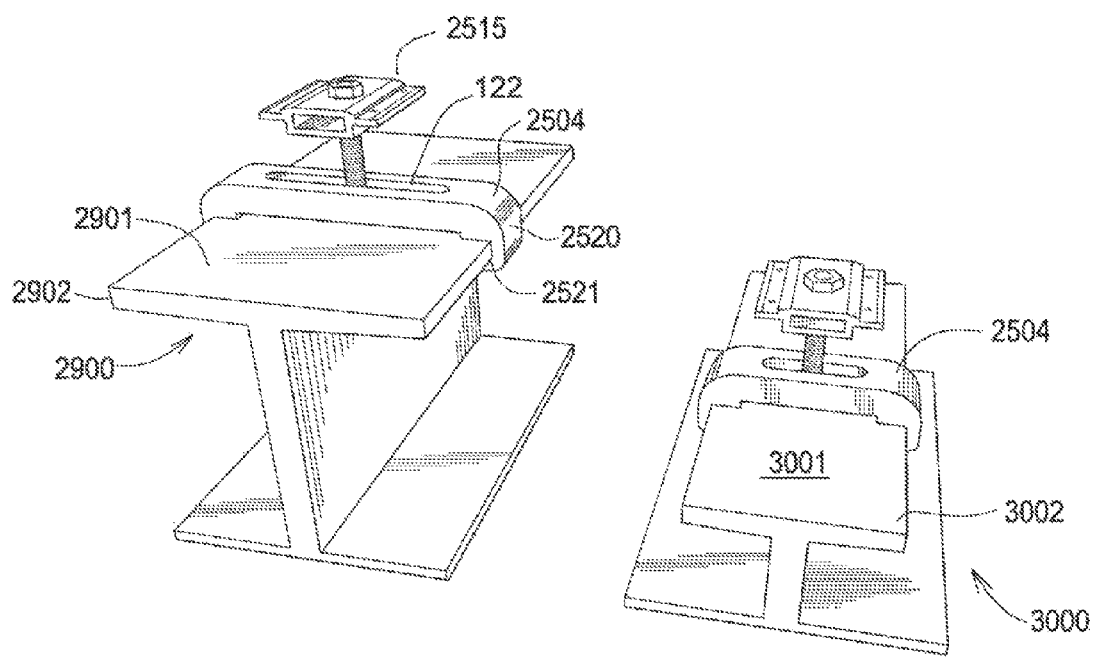
FIG. 29 is a view of another embodiment of the mounting system.
FIG. 30 is a view of another embodiment of the mounting system.

FIGS. 29 and 20 with the slide plate 2504 mounted on an upper surface 2901 or 3001 I beam 2900 or 3000. The slide plate 2504 slides onto one section 2901 or 3001 of the I beam, and functions identically to the previously described slide plate with the brackets 2520 and the grooves 2521 engaging the edge 2902 or 3002.

Figure 31:
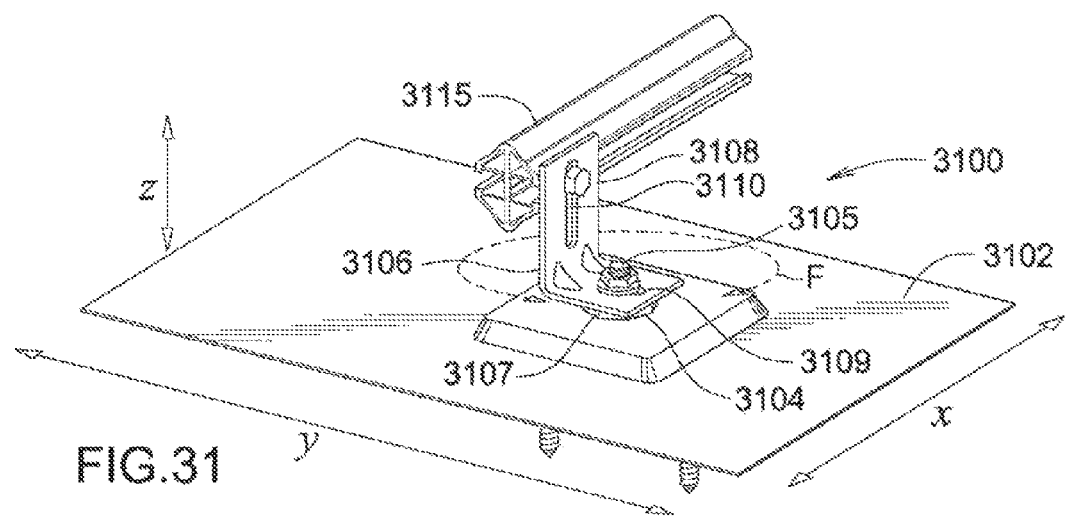
FIG. 31 is another embodiment of the mounting system, using the double stud as the attachment plate.
Figure 32:
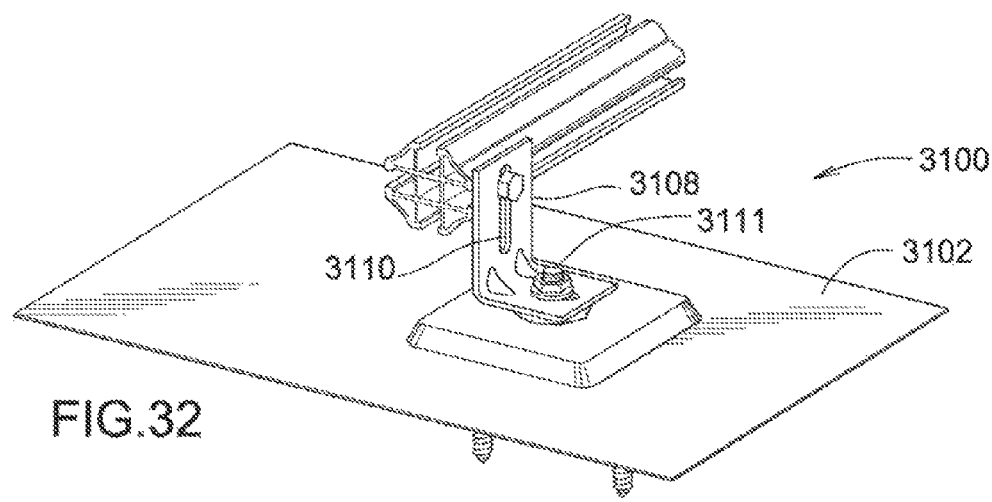
FIG. 32 is a perspective view of the embodiment of FIG. 31 with a four channel rail attached.
Figure 33:
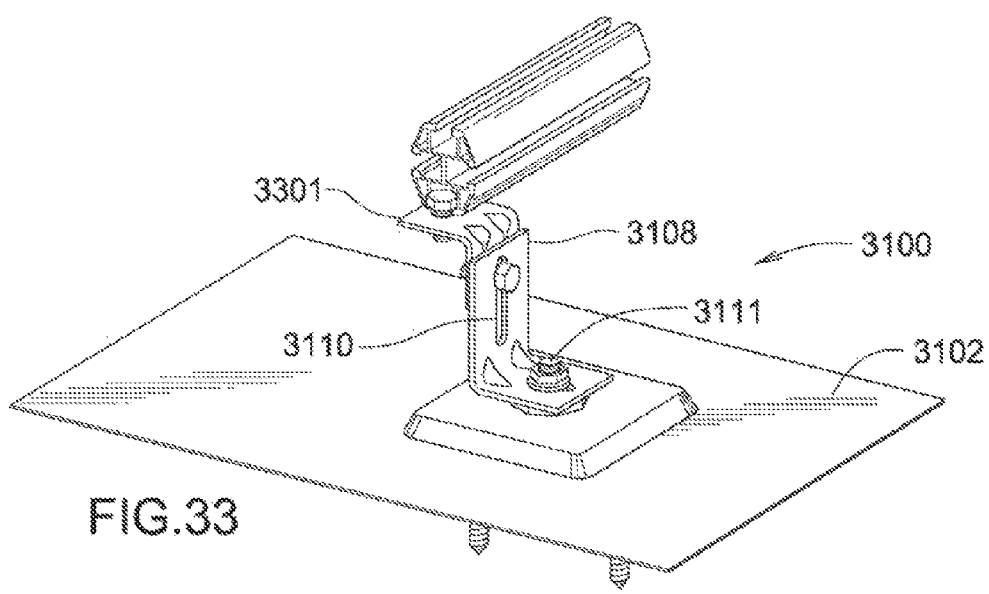
FIG. 33 is a view of the embodiment of FIG. 31 with a second L foot to provide adjustment in another direction.

FIGS. 31 through 33 are perspective views of another embodiment of the mounting system 3100. The flashing 3102 is mounted over the base plate (not shown) and attached with the double stud 3104 encapsulating the washer (not shown) as discussed above. The body of the double stud serves as the attachment plate in this embodiment. The upper bolt 3105 of the double stud serves as an attachment location for L foot 3106. The L foot has two legs 3107 and 3108 at a substantially right angel to each other. Each leg has an opening 3109, 3110, respectively, which can be either a hole or a slot, depending on if adjustability is desired along the longitudinal length of that leg in use. The two legs do not have to be the same length and do not have to have the same type of opening. The horizontal leg 3107 with hole 3109 is attached to the upper bolt 3105 with nut 3111. If the hole 3109 is a slot, the desired location for the vertical leg 3108 is chosen by the user and the horizontal leg 3107 is located appropriately on the double stud upper bolt 3105 and locked in place with nut 3111. Because of the L foot shape the specific location for the vertical leg can be anywhere in a diameter around the upper bolt as shown by arrow F. If the opening in the horizontal leg is a slot, a wider array of locations is available to the user for the vertical leg. This allows for adjustment of the location of the vertical leg is both the X and Y axis of the flashing. If a greater range of adjustment outward on either the X or the Y axis from the upper bolt is need, an additional L 3301 foot can be attached to the vertical leg 3108 as shown in FIG. 33. If hole 3110 in the vertical leg is a slot, adjustments can be made in the Z axis of the height of the attachment of the rail 3115. Any other type of device discussed herein can be attached as well. This system can be used to attach either a railed system, where the rail extend across the whole roof, or a "rail less" system where only short lengths of rails are attached the to L-foot to provide a mounting base for the solar panels. FIGS. 31-33 show a number of different types of rails attached to the mounting. No limitation of the type of rails is intended or should be inferred.

Figure 34:
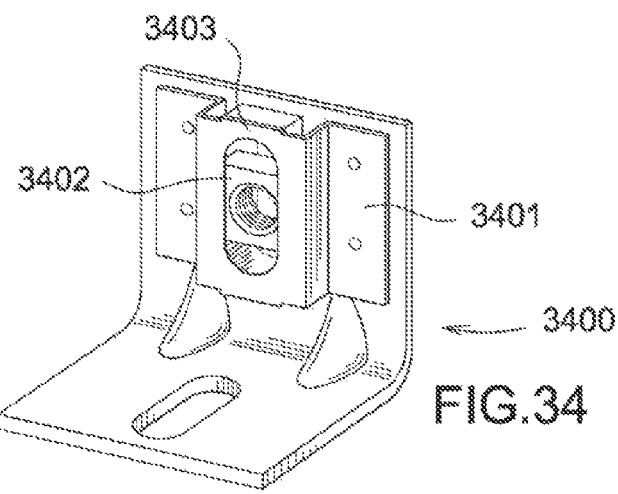
FIG. 34 is a perspective view of an L foot with a retaining clip holding a nut in place in relation to the vertical adjustment slot.
Figure 35:
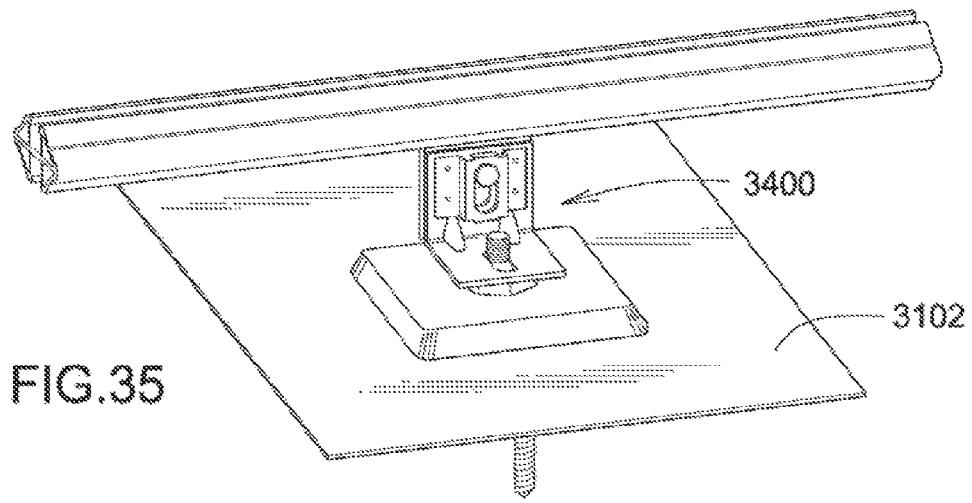
FIG. 35 is a perspective view of the L foot with retaining clip in use.
Figure 36:
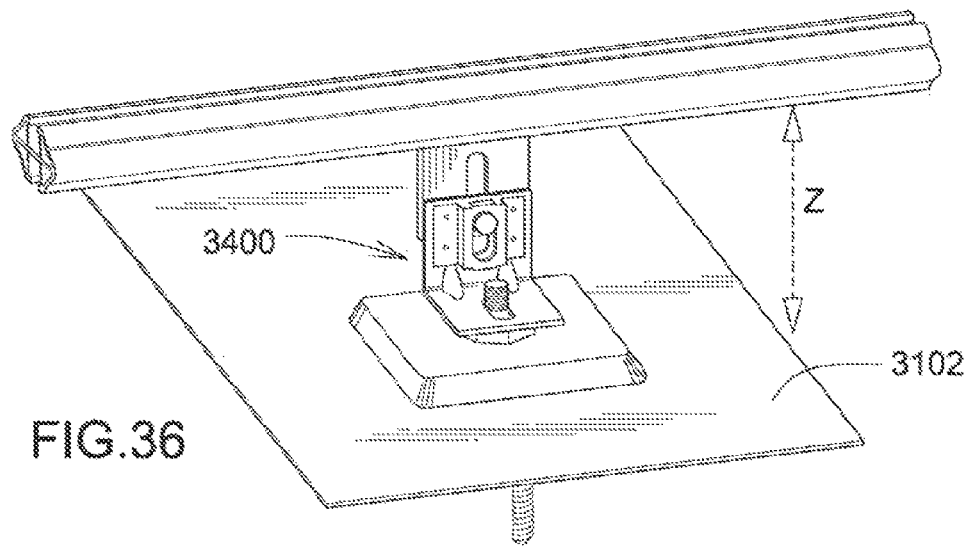
FIG. 36 is a perspective view of the L foot with retaining clip in use with the height of the rail adjusted up in the Z direction.

FIG. 34 is a perspective view of a modification of a standard L foot that can be used with the mounting system. The L foot 3400 has a retaining clip 3401 holding a nut 3402 in position against the slot 3403 so that the user does not have to risk losing the nut while trying to mount the rail or other device. The L foot 3400 is shown in use in FIGS. 35 and 36.

The two embodiments of the adjustable mounting system have many advantages over prior art systems. The smaller number of parts and elimination or reduction of the rails significantly reduces the cost of the mounting system, both to manufacture and ship. Further the system can be installed by one person if necessary and can all be installed from the top surface. There is no need to reach behind panels and/or under rails.

Figure 37:
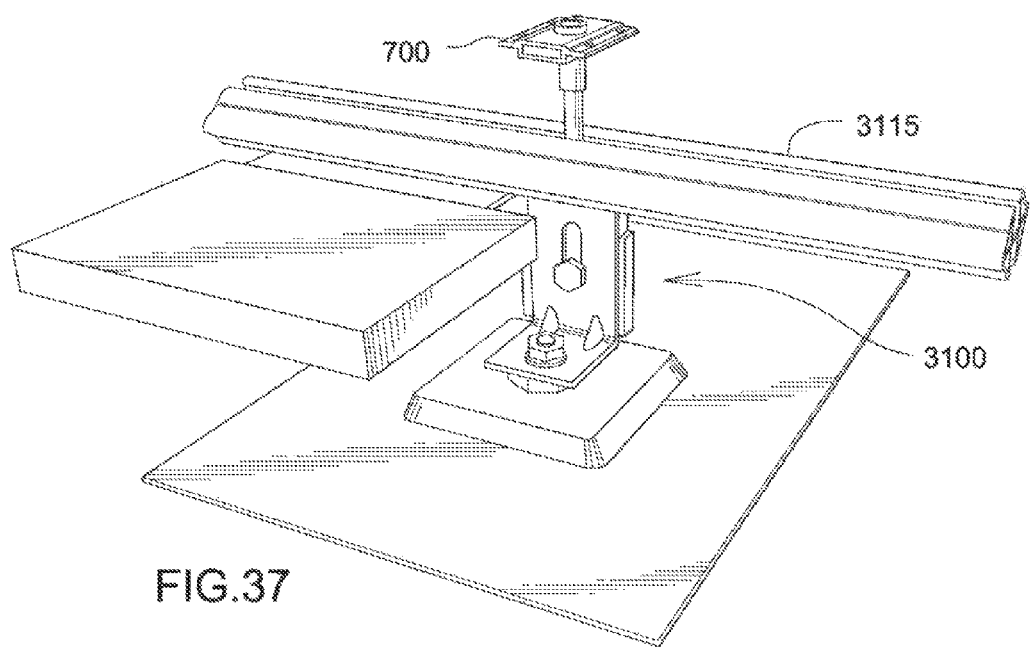
FIG. 37 is a perspective view of the mounting system with a micro inverter installed under the rail.
Figure 38:
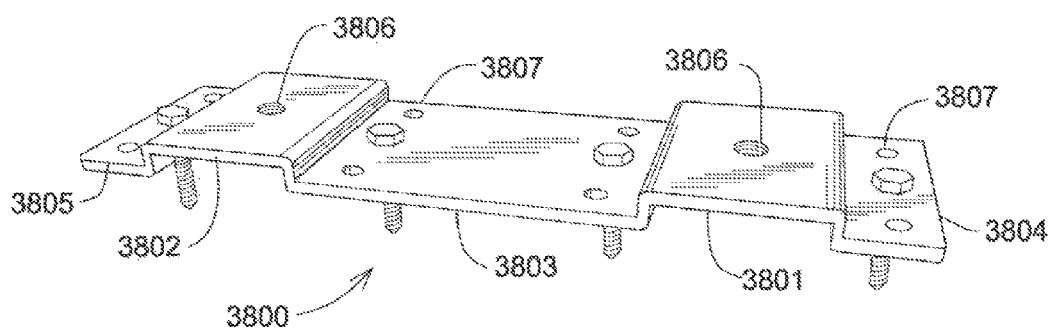
FIG. 38 is a perspective view a double base plate.

FIG. 37 is a perspective view of the mounting systems 3100 with a rail mounted on to and a micro inverter attached underneath the rail 3115. One of the advantages of the current system is that since the height off the roof (the Z direction) can be easily adjusted, this allows for the installation of micro inverters under the system without the need to change the rest of the mounting equipment. If micro inverters are desired in a given installation, the height off the roof can be set according to the geographical location (heat, snow etc.) type of roof and other reasons. If micro inverters are desired, then the system can easily be adjusted. Further all of the parts are re-usable, so if a panel is damaged, the same parts can be used to mount a replacement panel. FIG. 38 is a perspective view of an alternate embodiment of a base plate 3800. This base plate 3800 is a double base plate with two raised areas 3801 each with mounting holes 3806. The base plate has roof mounting areas 3803, 3804 and 3805 with attachment holes 3807. The base plate 3800 functions as described before, but allows for two mounting very close together. A single flashing with a raised area that covered both base plate raised areas would then be used.

Figure 39:
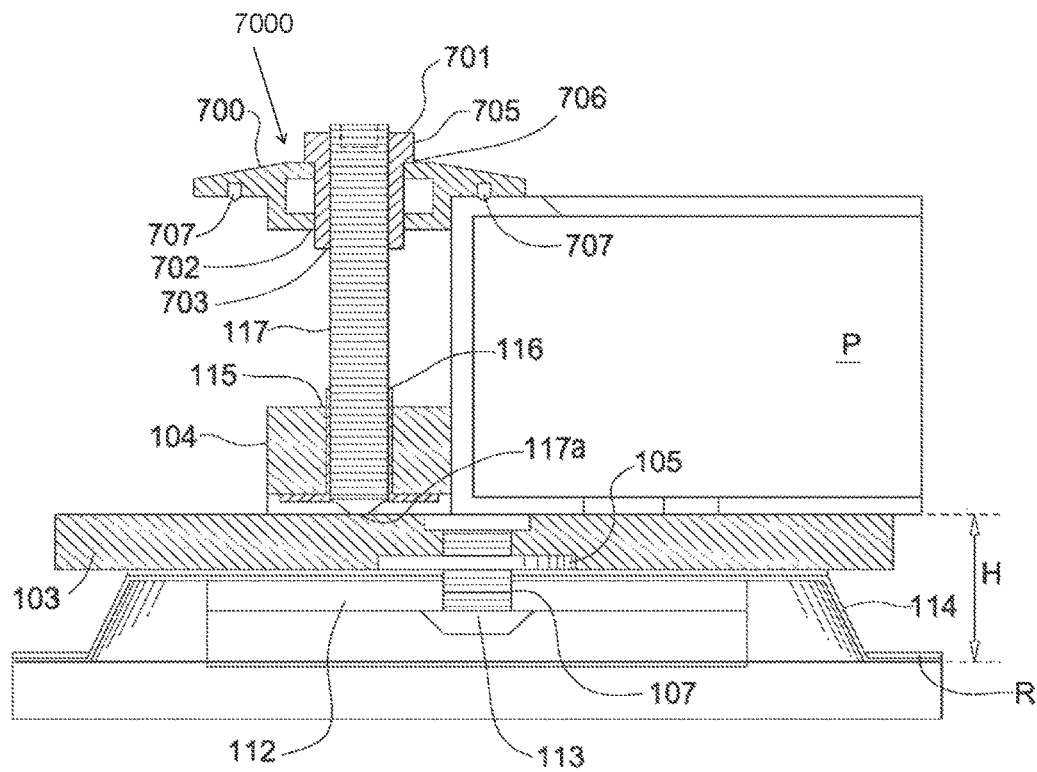
FIG. 39 is a cross sectional view through an assembly with a double clip tightened down in place on a panel.
Figure 40:
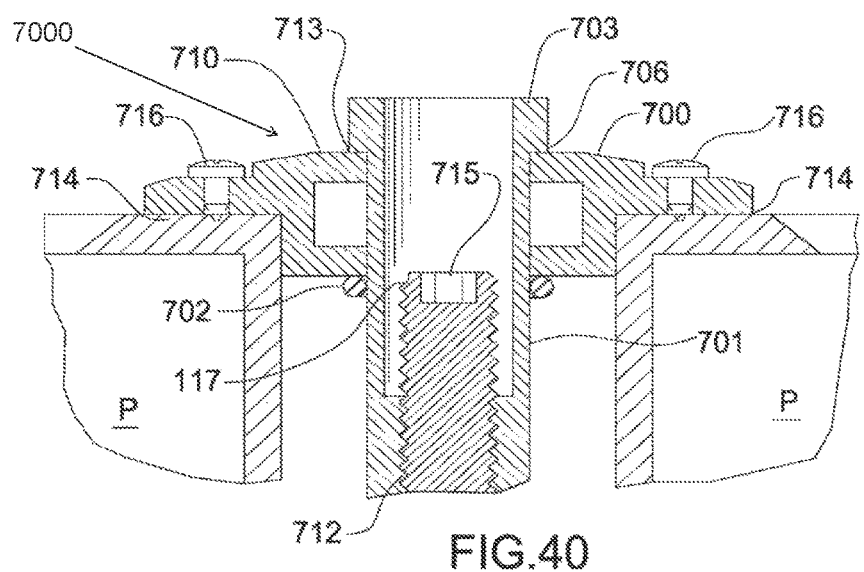
FIG. 40 is a close up of FIG. 39.
Figure 41:
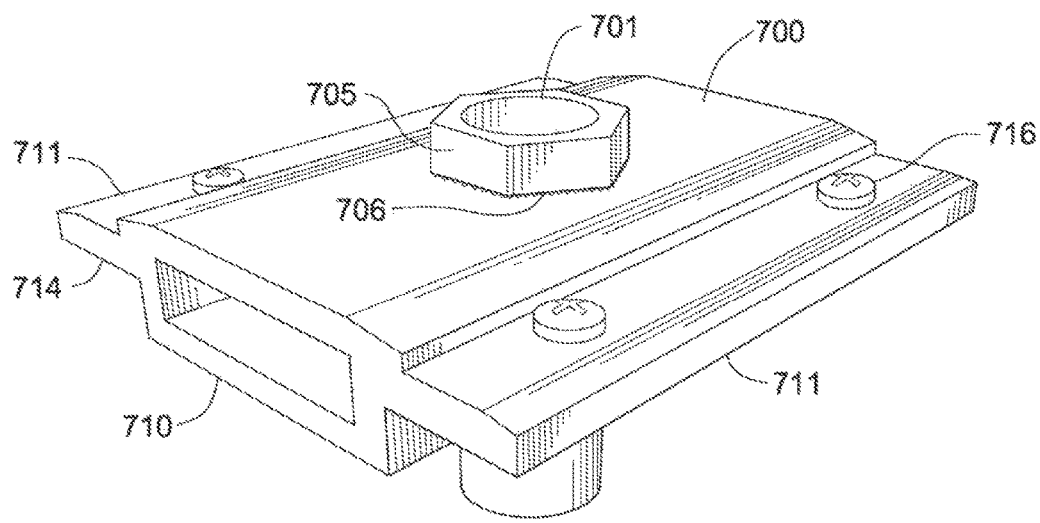
FIG. 41 is a perspective view of the top piece of the double clip.

A double clip 7000 for mounting and grounding solar panels is seen in FIGS. 39, 40 and 41 mounted on the adjustable mounting system described above. The top 700 has a central section 710 and side sections 711 extending laterally from the central section 710. In the depicted embodiment the central section is hollow, to save weight, but it can be either hollow or solid depending on the desired use. The central section has a hole 702 that fits the bushing 701. The bushing 701 has an interior bore 703 that is threaded with threads 712 for at least a portion of the length of the bore 703. The attachment bolt 117 has hex face 715 on its top in the depicted embodiment. Other types of wrench faces could be used. The attachment bolt 117 threads into the threads 712 in the bore 703. The bushing 701 has a serration 706 on the bottom surface 713 that rests against the top clip 700 as best seen in FIG. 41. The side sections 711 have grounding points 707 on the underside 714 that clamps down on the panel. In the depicted embodiment the grounding points 707 are formed by screws 716 that extend through the side sections 711. The grounding points 707 could be formed other ways, including by molding the top by machining. The screws allow the grounding points to be easily replaced if one is damaged.

The hex face 715 is used to drive the attachment bolt 117 down to thread through threaded hole 116 in nut retaining clip 115 mounted in slide plate 104. The attachment bolt 117 has a cup point stud 117a on its end to cut into attachment plate 103 once it is tightened down. Other types of cutting surfaces could be used as well. When the attachment bolt 117 is tightened the cup point 117a cuts a circular recess into the material below it. This can be in the attachment plate 103 or in a rail on the mid and end clips. The end of the attachment bolt could be a needle point or other cutting surface. The panel P can then be slid under the side sections 711 and the wrench face 705 of the bushing is used to tighten the top 700 down on to the panels, clamping them in place.

When the double clip 7000 is fully tightened down as seen in FIGS. 39 and 40, the serration on the bushing cuts into the top 700, the grounding points 707 of the clip cut into the frame of the solar panel, the stud point 117a on the attachment bolt 117 cuts into the attachment plate 103. These cuts all serve to both further lock the system together, and when the components are made of metal these interlocks serve to make grounding connections between all of the components. The bushing and the nut retaining clip are further grounded to the attachment bolt by the threaded connection between those parts. When the system is properly installed it has been rated to create an electrical ground of up to 650 Amps. This system of mounting and grounding the panels can be performed all from the top surface of the panels, with no need for the installer to get their hands under the panel. If the installer is not using any rails, the system is fully grounded to the mounting system by use of the double clip. If rails are used, to ground between rows or columns depending upon which way the existing clips are running an installer can use a piece of rail with top clip to transfer ground thus making all of the array connected (grounded) via the top clips.

Figure 42:
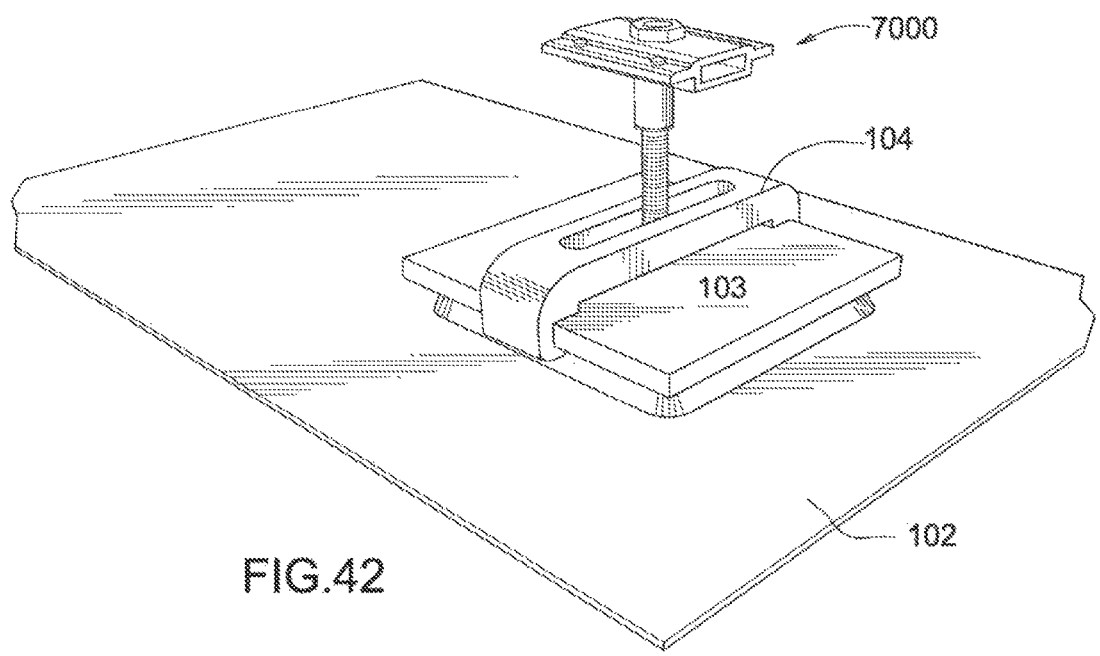
FIG. 42 is a perspective view of the double clip on the adjustable mounting assembly.
Figure 43:
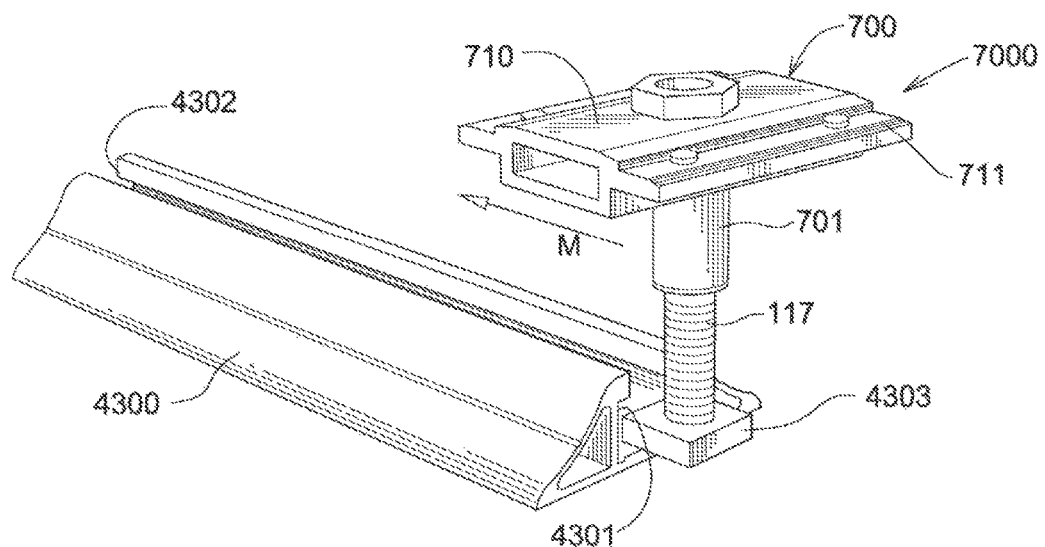
FIG. 43 is a perspective view of the double clip sliding into a rail for using the double clip to mount to rail.

FIG. 42 is a perspective view of the double clip 7000 mounted on the adjustable flashing and mounting assembly in the configuration that the double clip would be used to mount the panels on top of the slide plate 104. If the panels were to be mounted on the attachment plate 103 the top 700 of double clip 7000 would be turned 90 degrees.

Figure 44:
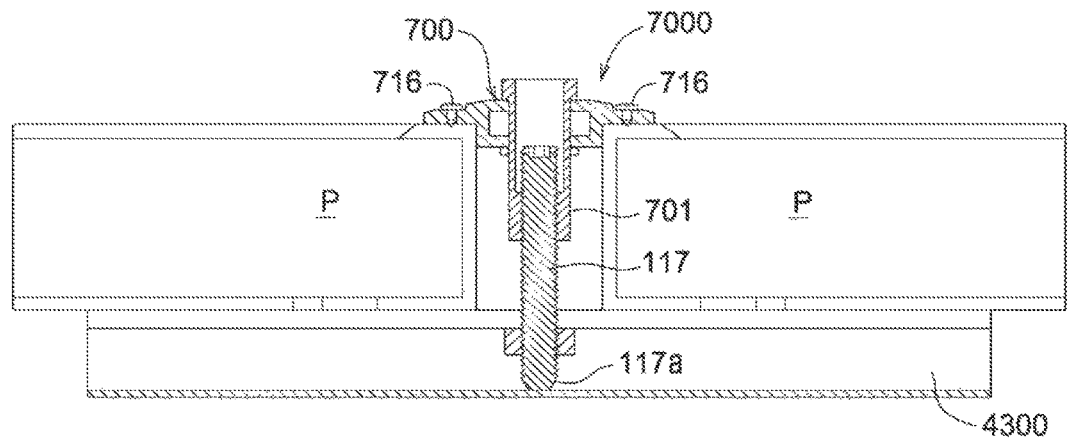
FIG. 44 is a cross sectional view of the double clip mounting two panels to a rail.
Figure 45:
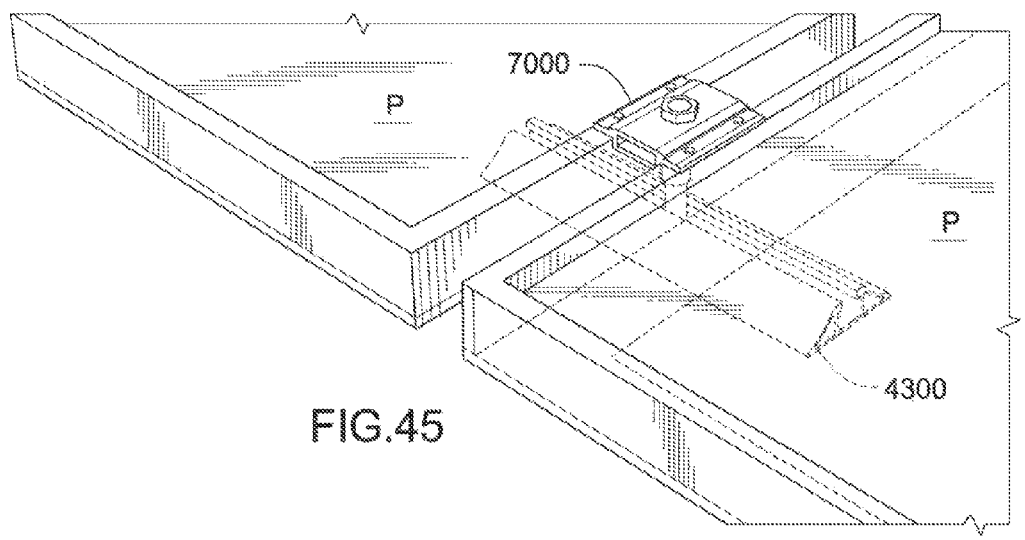
FIG. 45 is a perspective view of the double clip with two panels mounted on a partial rail.
Figure 46:
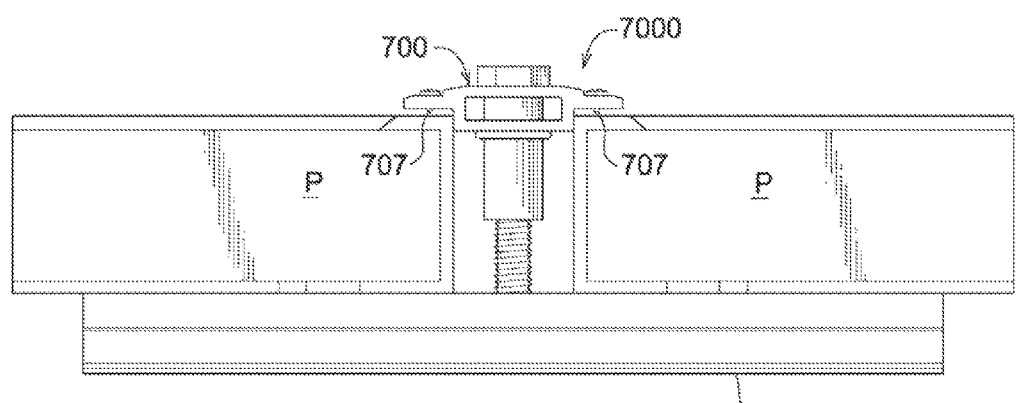
FIG. 46 is cross sectional view of the double clip before the top piece has been tightened down.

Referring next to FIGS. 43 through 46, the double clip 7000 can also be used to mount solar panels to rails 4300 with a longitudinal groove 4301 with a narrowed top opening 4302. The double top clip 7000 has a nut 4303 threaded onto one end of attachment bolt 177. The nut 4301 is sized such that it will fit in the width of the groove 4301 but will not fit through the top opening 4302. The nut 4303 also needs to be sized such that it cannot rotate in the groove. The double top clip 700 is slid into the groove 4301 as shown by arrow M in FIG. 43. When the desired location is reached, the attachment bolt 117 is screwed down through the nut until its end 117a cuts into the rail as shown in FIG. 44. The nut 4303 ends up against top opening 4302. FIG. 46 shows the top clip before it is tightened down onto the panel, cutting the grounding points 707 into the panel, as seen in FIG. 44. FIG. 45 shows the partial rail with the panels mounted over it with the double clip 7000.

Figure 47:
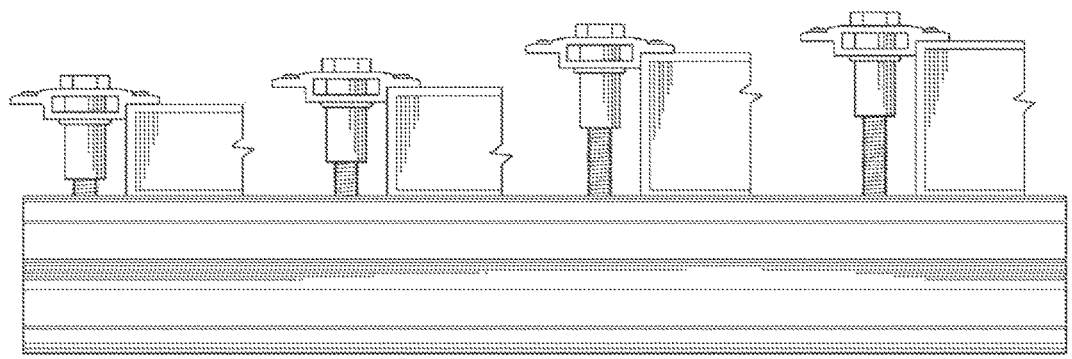
FIG. 47 is a side elevation view of the range of sizes of panel the double clip can hold.

FIG. 47 shows the range of heights of solar panels that can be mounted with double clip 7000 due to the attachment bolt and the bushing 701 threading together. As shown, the depicted embodiment could be used to mount panels with a height between 30 mm and 50 mm.

Figure 48:
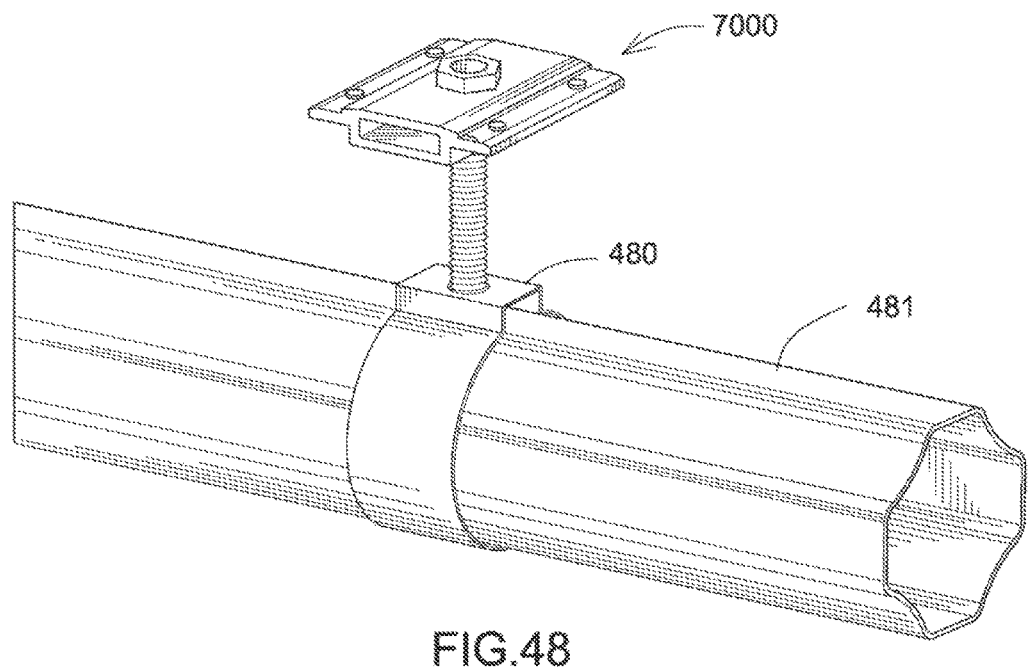
FIG. 48 is a perspective view of the double clip mounted on rail without a groove.

FIG. 48 is a perspective view of the double clip 7000 mounted on rail 481 without a groove. A band 480 with a threaded hole is slid onto the rail. At the desired location the top clip is tightened down, cutting into the rail as above. A nut held in place behind an unthreaded hole, similar to what is seen in FIG. 34 could also be used.

Figure 49:
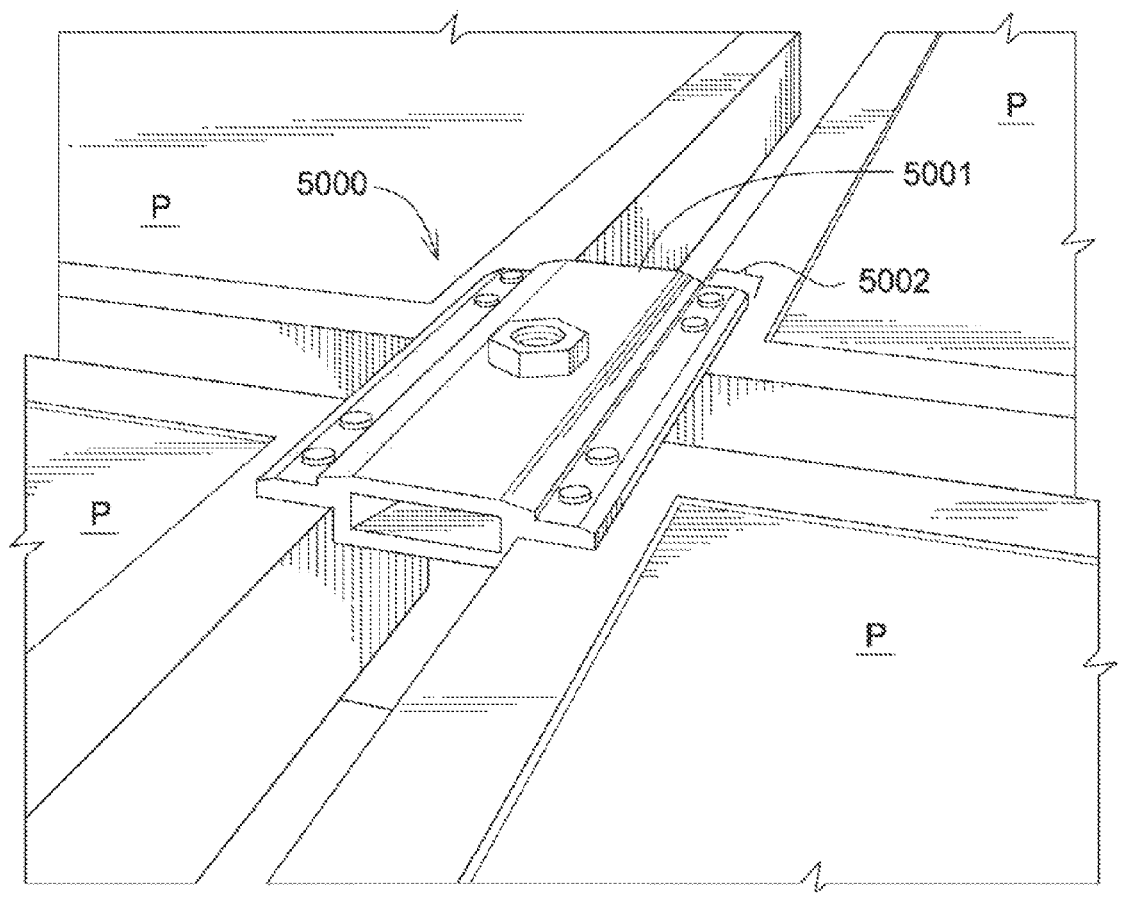
FIG. 49 is a perspective of a large double clip that can be used to hold four panels at once.

FIG. 49 shows an alternate embodiment of the double clip 5000 which can be used to mount four panels P. The top section 5001 is longer and has two grounding points 5002 in each corner, such that each panel P has two grounding points cutting into it.

Figure 50:
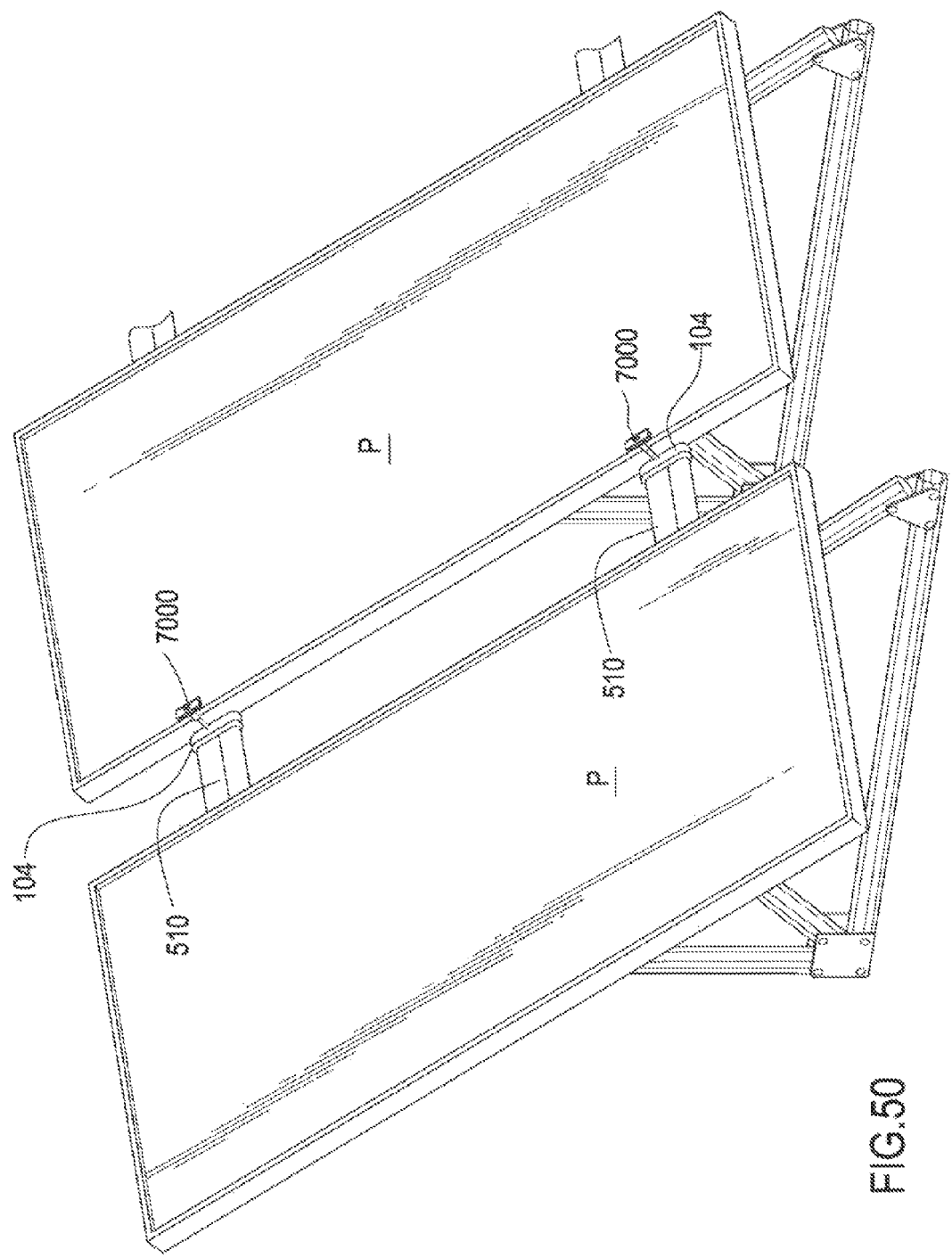
FIG. 50 shows the slide plate and double clip being used to mount solar panels on a ground array.

As seen in FIG. 50, the double clip 7000 and the slide plate 104 can be used together with large slanting frames to mount the solar panels. The slide plate is slid on the cross bars 510 of the frame and the double clips 7000 hold the panels P in place and ground them as discussed above.

Figure 51:
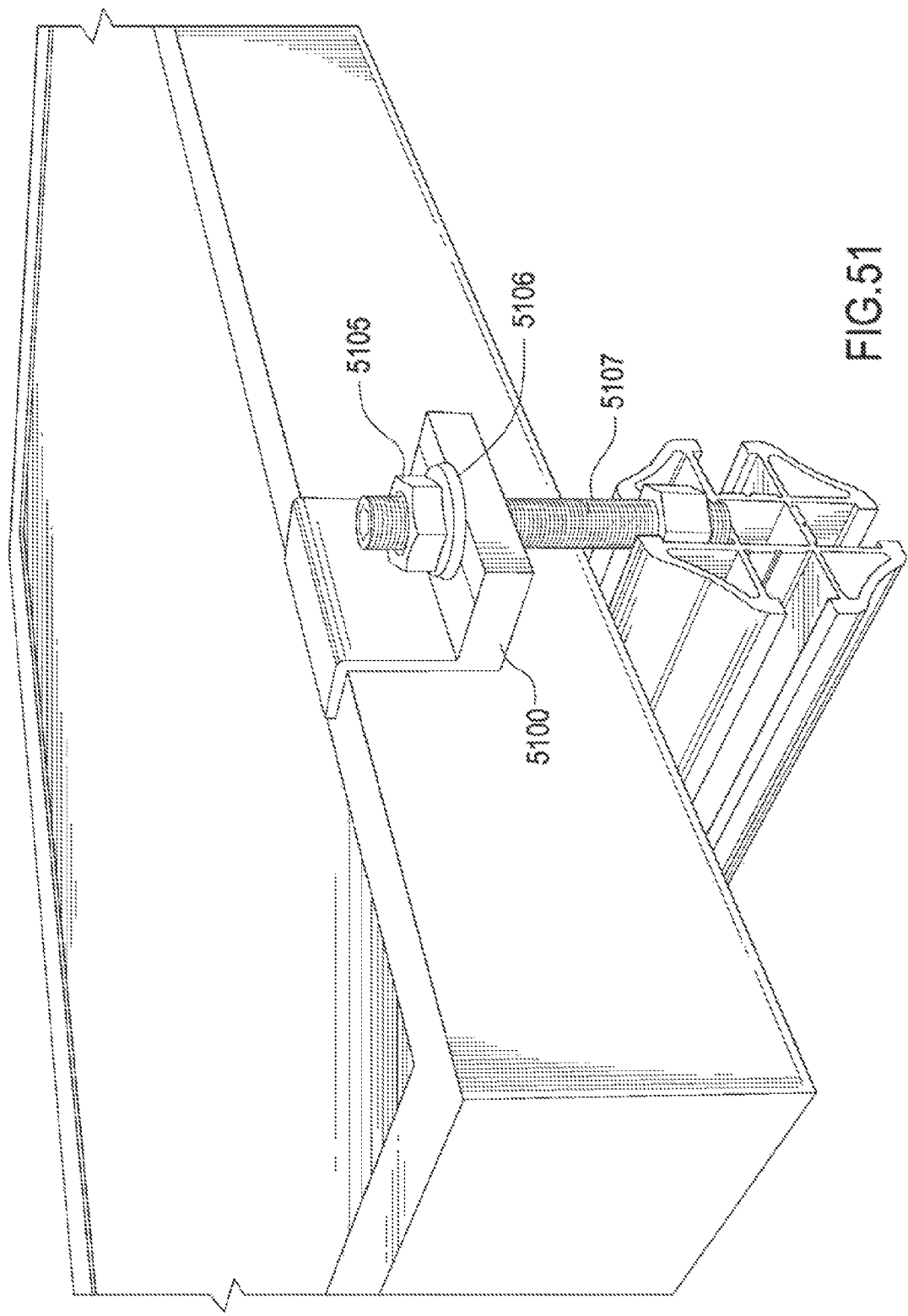
FIG. 51 is a perspective view of a universal mounting clip holding a panel in place.
Figure 52:
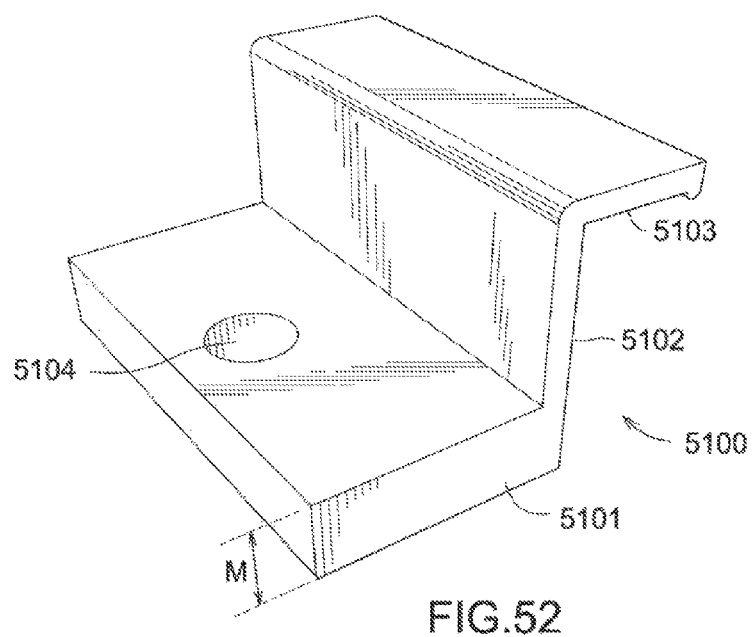
FIG. 52 is a perspective view of the universal mounting clip.
Figure 53:
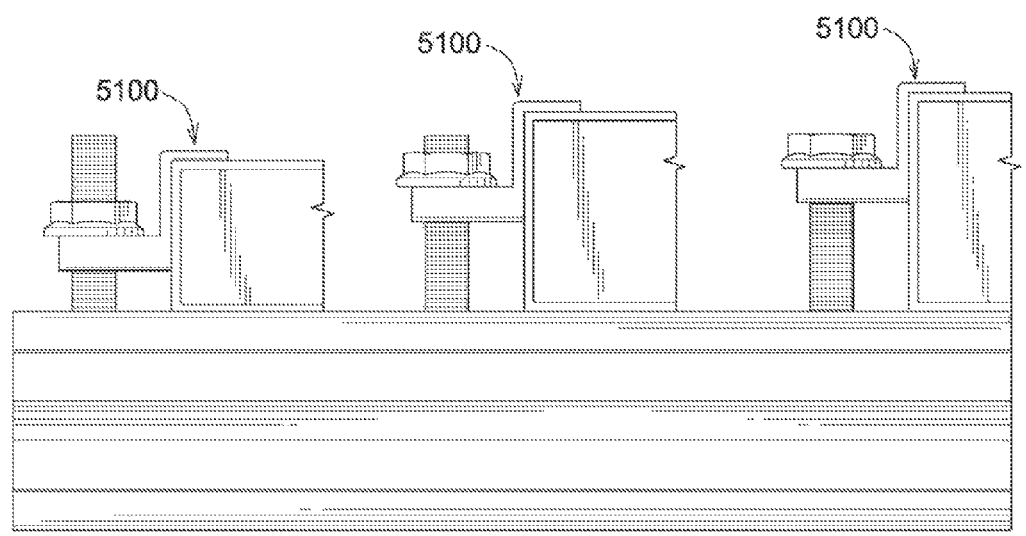
FIG. 53 is a side perspective view of the universal mounting clip showing the variety of heights that can be mounted with the clip.

FIGS. 51 to 53 shows a universal mounting clip 5100 that can be used to mount solar panels with a height between 35 mm to 50 mm. The mounting clip 5100 has a thickened base 5101. In the depicted embodiment, the base is 8 mm thick at height M and is solid. The base can be hollow, so long as the thickness is maintained and the walls are sufficiently rigid. The base cannot be much narrower than 8 mm, but it is believed that it can be thicker than 8 mm. The base functions to form a platform for the stud to transverse and reach down to the rail or other attachment location while holding the rest of the clip largely vertical even when nut 5105 is tightened down with washer 5106. The hole 5104 that the stud 5107 goes through must be machined to be a very small amount larger than the diameter of the stud. It is believed that the tolerances are between 3 to 5 thousandth of an inch. Due to the tight fit of the base around the stud and the thickness of the base, mounting clip remains largely level even when it is significantly above the surface of the rail, as seen in FIG. 53. Prior art mounting clips, seen in FIG. 8, have to rest on the mounting surface.

Although the adjustable mounting and flashing assembly 100 has been discussed in terms of mounting solar panels on roofs, it is to be understood that the assemblies 100 could be used to mount any number of devices on roofs or other surfaces with little or no modification. Devices that could be mounted, include, but are not limited to photovoltaic (framed and unframed), thermal, hybrid collectors, antennas, telecom equipment, pipes, conduits, and others. For unframed solar panels known in the art, rubber pads would be used to protect the panel.

In all embodiments, the components can be made of aluminum, copper, mild steel, stainless steel, nickel, or other metals, coated metal, plastic, fiberglass, composites, ceramic, carbon fiber material, rubber polymer, concrete, cementitious or any other material with the necessary physical characteristic. In some applications the assembly will need to be conducting, in order to allow for grounding of the components mounted on the system. In all embodiments, if desired the installer can put caulk or other sealant around all joins as a further assurance of water proof joints. This is not necessary under normal usage conditions, but may be desired in harsh environments and/or remote locations.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

The invention claimed is:

1. An electrically conductive grounding clip for mounting solar panels to an underlying structure, comprising:
   a central section having a lower portion with first and second at least partially vertical surfaces for disposition between edge surfaces of first and second solar panels;
   first and second side sections having first and second horizontal bottom surfaces, respectively, extending laterally from said first and second vertical surfaces of said central section, respectively, wherein said horizontal bottom surfaces are adapted to engage and compress against top surfaces of the first and second solar panels, respectively;
   at least first and second grounding elements disposed within an aperture extending through at least a portion of said first and second horizontal bottom surfaces of said first and second side sections, respectively, wherein said first and second grounding elements include pointed tips extending from said first and second bottom horizontal surfaces, respectively, wherein said pointed tips are adapted to at least partially penetrate electrically conductive surfaces of the first and second solar panels when said horizontal surfaces are compressed against the solar panels; and
   a central section aperture extending through said central section between said first and second side sections.

2. The clip of claim 1, wherein said lower portion of said central section and said bottom surfaces of said side sections define a T-shaped surface.

3. The clip of claim 1, wherein said grounding elements comprise:
   screws extending through said side sections.

4. The clip of claim 1, further comprising:

a threaded element having an upper portion disposed through said central section aperture and a lower threaded portion adapted to threadably engage a mating threaded structure, wherein upon said lower threaded portion engaging the mating threaded structure, said threaded element may be threadably advanced to compress said bottom surfaces of said side sections against the top surfaces of the solar panels.

5. The clip of claim 4, wherein said threaded element further comprises a flanged upper portion with a lower surface that rests on a top surface of said central section about said central section aperture.

6. The clip of claim 5, wherein said lower surface of said flanged upper portion of said threaded element comprises a plurality of serrations, wherein said serrations cut into said top surface of said central portion when said threaded element is threadably advanced to compress said bottom surfaces of said side sections against the top surfaces of the solar panels.

7. The clip of claim 6, wherein upon said serrations cutting into said top surface of said central portion said grounding elements penetrating the electrically conductive surfaces of the solar panels, the solar panels and said clip are electrically connected.

8. The clip of claim 4, wherein said threaded element further comprises:

an at least partially pointed tip on a lower terminal end.

9. The clip of claim 4, wherein said threaded element comprises:

a bushing having a threaded bore, wherein said mating threaded structure comprises a threaded bolt.

10. The clip of claim 1, wherein said first and second at least partially vertical surfaces are parallel.

11. An electrically conductive grounding clip for mounting solar panels to an underlying structure, comprising:

a top member with an aperture between first and second side sections, wherein said first and second side sections have first and second bottom surfaces, respectively, adapted to engage and compress against top surfaces of first and second solar panels, respectively;

a threaded element having a flange with a lower surface that rests on a top surface of said top member about said aperture, wherein said threaded element may be threadably advanced relative to a mating threaded structure to compress said first and second bottom surfaces of said top member against the top surfaces of the first and second solar panels;

a serrated element disposed between said lower surface of said flange and said top surface of said top member, wherein said serrated element is operative to cut into said top surface of said top member when said threaded element is threadably advanced to compress said bottom surfaces top member against the first and second solar panels; and at least first and second grounding elements disposed within apertures extending through at least a portion of said first and second bottom surfaces of said first and second side sections, respectively, wherein said first and second grounding elements include pointed tips extending from said first and second bottom surfaces, respectively, wherein at least said pointed tips are adapted to at least partially penetrate electrically conductive surfaces of the first and second solar panels when said bottom surfaces are compressed against the solar panels.

12. The clip of claim 11, wherein said grounding elements comprise:

screws extending through said side sections.

13. The clip of claim 11, wherein said top member further comprises:

a raised section between said first and second bottom surfaces, wherein said raised section is adapted to fit between side surfaces of the first and second solar panels when said first and second bottom surfaces engage and compress against top surfaces of first and second solar panels.

14. The clip of claim 13, wherein said first and second bottom surfaces are horizontal surfaces and said raised section included first and second vertical surfaces substantially perpendicular to said horizontal surfaces.

15. The clip of claim 14, wherein said vertical surfaces prevent rotation of said top member.

16. The clip of claim 11, wherein said serrated element is integrally formed with said lower surface of said flange.

* * * * *